United States Patent
Miracle et al.

(10) Patent No.: US 9,757,922 B2
(45) Date of Patent: Sep. 12, 2017

(54) HEAT TRANSFER LABEL HAVING A UV LAYER

(75) Inventors: Ronald L. Miracle, Batavia, OH (US); Alexander Craig Bushman, Loveland, OH (US); Jean Paul Laprade, North Smithfield, RI (US)

(73) Assignee: Multi-Color Corporation, Batavia, OH (US)

( * ) Notice: Subject to any disclaimer, the term of this patent is extended or adjusted under 35 U.S.C. 154(b) by 0 days.

(21) Appl. No.: 12/699,480

(22) Filed: Feb. 3, 2010

(65) Prior Publication Data
US 2011/0189477 A1  Aug. 4, 2011

(51) Int. Cl.
| B32B 7/12 | (2006.01) |
| B32B 7/06 | (2006.01) |
| C09J 7/02 | (2006.01) |
| G09F 3/10 | (2006.01) |

(52) U.S. Cl.
CPC ............... *B32B 7/06* (2013.01); *B32B 7/12* (2013.01); *C09J 7/02* (2013.01); *G09F 3/10* (2013.01); *Y10T 428/2817* (2015.01); *Y10T 428/2826* (2015.01)

(58) Field of Classification Search
None
See application file for complete search history.

(56) References Cited

U.S. PATENT DOCUMENTS

| | | | |
|---|---|---|---|
| 3,922,435 A * | 11/1975 | Asnes | 428/349 |
| 3,989,609 A | 11/1976 | Brack | |
| 4,052,527 A * | 10/1977 | Pastor et al. | 428/463 |
| 4,218,294 A | 8/1980 | Brack | |
| 4,288,479 A | 9/1981 | Brack | |
| 4,303,696 A | 12/1981 | Brack | |
| 4,466,994 A | 8/1984 | Hubbard et al. | |
| 4,704,310 A | 11/1987 | Tighe et al. | |
| 5,630,363 A | 5/1997 | Davis et al. | |
| 5,919,834 A | 7/1999 | Downs et al. | |
| 5,932,319 A * | 8/1999 | Makar et al. | 428/32.79 |
| 6,083,620 A | 7/2000 | LaPrade et al. | |
| 6,099,944 A | 8/2000 | Laprade et al. | |
| 6,228,486 B1 * | 5/2001 | Kittel et al. | 428/354 |
| 6,250,316 B1 | 6/2001 | Brandt et al. | |
| 6,254,970 B1 | 7/2001 | Hiatt et al. | |
| 6,284,816 B1 | 9/2001 | Laksin et al. | |
| 6,376,069 B1 | 4/2002 | Bilodeau et al. | |
| 6,379,761 B1 | 4/2002 | Brandt et al. | |
| 6,379,766 B1 | 4/2002 | Blom et al. | |
| 6,391,416 B1 | 5/2002 | Blom et al. | |
| 6,423,406 B1 | 7/2002 | Bilodeau | |
| 6,616,786 B2 | 9/2003 | Blom et al. | |
| 6,656,306 B1 | 12/2003 | Mabbott | |
| 6,803,085 B2 | 10/2004 | Blom et al. | |
| 7,014,895 B1 | 3/2006 | Grotefend et al. | |
| 7,021,549 B2 | 4/2006 | O'Rell et al. | |
| 7,364,777 B1 | 4/2008 | Ansari | |
| 7,622,171 B2 | 11/2009 | Laprade | |
| 8,932,706 B2 * | 1/2015 | Laprade | 428/141 |
| 9,206,338 B2 * | 12/2015 | Laprade | C09J 7/0203 |
| 9,511,621 B2 * | 12/2016 | Laprade | B44C 1/172 |
| 2002/0031661 A1 | 3/2002 | Bilodeau et al. | |
| 2003/0054139 A1 * | 3/2003 | Ylitalo et al. | 428/195 |
| 2007/0104946 A1 * | 5/2007 | Laprade | 428/343 |
| 2007/0289480 A1 * | 12/2007 | Yang et al. | 106/2 |
| 2008/0138550 A1 * | 6/2008 | Takahashi et al. | 428/35.7 |
| 2009/0011165 A1 * | 1/2009 | Takahashi et al. | 428/41.3 |
| 2009/0047508 A1 | 2/2009 | Chiu et al. | |
| 2014/0170341 A1 * | 6/2014 | Katarya et al. | 428/32.39 |

FOREIGN PATENT DOCUMENTS

JP  2000309199 A  11/2000

OTHER PUBLICATIONS

Richard J. Lewis, Sr., "Hawley's Condensed Chemical Dictionary", Fifth Edition, 2007, p. 547.*
Definition of "oligomer" from dictionary.com, retrived on Aug. 4, 2014.*
International Search Report and Written Opinion in PCT/US2011/052482 dated Apr. 20, 2012.
International Preliminary Report on Patentability in PCT/US2011/052482 dated Mar. 26, 2013.

* cited by examiner

*Primary Examiner* — Anish Desai
(74) *Attorney, Agent, or Firm* — Wood Herron & Evans LLP

(57) ABSTRACT

A heat transfer label and method for preparing same, the heat transfer label including (a) a support portion and (b) a transfer portion over the support portion, for transfer of the transfer portion from the support portion to an article upon application of heat to the support portion while the transfer portion is placed into contact with the article. The transfer portion includes at least a protective lacquer layer, an ink layer, and an adhesive layer, wherein at least one of the protective lacquer layer, the ink layer, and the adhesive layer is UV-curable. Further, the heat transfer label may additionally include a tie-coat layer, which may be a UV-curable tie-coat layer. Further, each of the plurality of layers of the transfer portion of the heat transfer label may be UV-curable.

17 Claims, 8 Drawing Sheets

HEAT TRANSFER LABEL HAVING A UV LAYER

FIELD OF THE INVENTION

The present invention relates generally to labels for various articles, and relates more specifically to heat transfer labels for articles, such as containers.

BACKGROUND OF THE INVENTION

This section is intended to introduce the reader to various aspects of art that may be related to various aspects of the present invention, which are described and/or claimed below. This discussion is believed to be helpful in providing the reader with background information to facilitate a better understanding of various aspects of the present invention. Accordingly, it should be understood that these statements are to be read in this light, and not as admissions of prior art.

Heat transfer labels are multilayered laminates, with each layer having its own function. For example, heat transfer labels generally include an adhesive layer, an ink design layer, and a release layer. The release layer may be a wax release layer, and is often directly adjacent a carrier sheet, such as on a roll or web of labels. Thus, in such an example, the label may be thought to include a "support portion" (e.g., carrier sheet and release layer) and a "transfer portion" (e.g., ink design layer and adhesive layer). When subjected to heat, the wax release layer softens or melts, thereby allowing the transfer portion to be separated from the carrier sheet, and the adhesive layer adheres the ink design layer to an article being labeled. Alternatively, all or part of the wax release layer may transfer as well, to provide protection to the ink design layer. Additionally or alternatively, the labels may include a separate protective layer overlying the ink design layer to protect the ink design layer from abrasion and product resistance.

More specifically, in the heat transfer labeling process, the label-carrying sheet is subjected to heat, and the label is pressed onto an article with the adhesive layer making direct contact with the article. (Alternatively, in an embodiment having an adhesive incorporated in the ink design layer, the ink design layer may make direct contact with the article.) As the paper sheet is subjected to heat, the wax layer begins to soften or melt so that the paper sheet can be released from the ink design layer. (And, as described above, a portion of the wax layer may be transferred with the ink design layer and a portion of the wax layer may remain with the paper sheet.) After transfer of the ink design layer to the article, the paper sheet is removed, leaving the ink design layer firmly affixed to the article. In an alternate embodiment, where the wax layer also transfers, the wax layer thus may serve two purposes: (1) to provide release of the ink design layer from the sheet upon application of heat to the sheet, and (2) to form a protective layer over the transferred ink design layer. After transfer of the label to the article, the transferred wax release layer may be subjected to a postflaming technique which enhances the optical clarity of the layer (thereby enabling the ink design layer therebeneath to be better observed) and which enhances the protective properties of the transferred wax layer.

Such heat transfer labels have been used to decorate a variety of articles, such as polyethylene, polypropylene, PET, and acrylonitrile articles. For example, such articles may include high-density polyethylene (HDPE) containers, low-density polyethylene (LDPE) containers, and polypropylene containers. One example of a heat transfer label that has been used to decorate polyethylene (PE) containers includes a paper carrier sheet overcoated with a wax release layer (approximately 6-8 lbs. wax/3,000 square feet of paper carrier web). A number of layers that make up the transfer portion of the heat transfer layer are then associated with the paper carrier sheet with wax release layer of the support portion. In one exemplary embodiment of a current heat transfer label, these layers may include a protective lacquer layer, an ink design layer, and an adhesive layer. The protective lacquer layer is printed on the wax release layer. The ink design layer is printed on the protective lacquer layer. And the adhesive layer is printed on the ink design layer. Those skilled in the art will realize that these layers, number of layers, and configuration of layers is merely exemplary of one heat transfer label presently in use.

Heat transfer labels are generally made using rotogravure printing techniques. In rotogravure techniques, the printing plates for the ink, lacquer, adhesive, and/or any other component(s) are in cylinder form, and include wells that are etched or engraved to differing depths and/or sizes to provide the image or images. The component, such as ink, lacquer, or adhesive, is applied directly to the cylinders, such as by rotating them in baths containing the component so that each cell of the cylinder is flooded with the component. A doctor blade wipes away the excess component, and capillary action of the substrate and pressure from impression rollers draw the component out of the wells and transfer it to the substrate. However, there are drawbacks to using rotogravure printing. Problems with this method of preparing such labels include the fact that the cost of tooling to produce the labels (i.e., the cost of preparing engraved cylinders) is very expensive. And thus, long production runs are required to make the manufacturing process efficient.

Further, heat transfer labels are printed with solvent inks because the solvent ink chemistry is flexible and able to withstand significant stretch during the decoration step. For example, once the label is printed on the wax carrier, the label is applied to an article. During this decoration step, it may be preferable to "stretch" the label (i.e., the surface speed of the article exceeds the speed of the moving web). This can help to prevent vertical gathers (also called creping) that may be observed due to the mechanical nature of the decorating process. The ability to stretch the label due to the solvent-based components is also beneficial in that it allows for the decoration of tapered containers (such as cups, buckets) and objects with compound curves.

However, the solvent-based components that are used when making heat transfer labels pose a number of drawbacks. In particular, such solvent-based components raise health, safety, and environmental concerns. For example, most organic solvents are flammable or highly flammable, depending on their volatility. Mixtures of solvent vapors and air can explode. Solvent vapors are heavier than air, and so they can and will sink and can travel large distances in an undiluted or nearly undiluted state. Solvent vapors can also be found in supposedly empty drums and cans, posing a flash fire hazard. Further, many solvents can lead to a sudden loss of consciousness if inhaled in large amounts. And, some solvents pose health issues—such as chloroform and benzene, which are carcinogenic. Many others can damage internal organs like the liver, the kidneys, or the brain. More solvent-related health issues arise from spills or leaks of solvents that reach the underlying soil. Since solvents readily migrate substantial distances, the creation of widespread soil contamination is not uncommon. The problems of subsurface solvent contamination can be greatly amplified if the solvents leach into, or otherwise gain access to, water supply. These problems also result in many difficulties, and in high costs, of using solvent-based materials and disposing of solvents or solvent waste during and following production runs.

The use of flexographic printing can reduce the costs associated with the more expensive gravure printing, especially as run lengths get shorter. One reason that flexographic printing has not been pursued aggressively until recently is that the chemistry of the solvent inks are incompatible with the photopolymer plates due to a phenomenon known as "swelling." Basically, when certain traditional rotogravure printing solvent components are applied to the photopolymer plate used in flexographic printing, the components can degrade and be absorbed by the plate. Thus, the plates can only be used for a single run. Thereafter, a new plate would have to be used. Such a rapid turnover in plates is extremely expensive to the point that it is not feasible.

Thus, the desire in the printing and label industry is to move away from solvent-based technology. The present movement in the industry has been from solvent-based technology to water-based technology. However, water-based technology has its own limitations. For example, water-based ink has lower product resistance. In addition, ink quality (pH, drying, and viscosity) must be diligently monitored and maintained throughout the print run to avoid variation in print quality. And, heat transfer products produced with water based ink are lower gloss, which is not desirable.

UV-curable inks are not solvent-based. And so, use of such UV-curable inks could eliminate the drawbacks described above with solvent-based components. However, there are additional drawbacks that arise when UV-curable inks are used to prepare labels such as heat transfer labels. For example, UV-curable ink layers do not exhibit the ability to "stretch" like the solvent-based and water-based components, and so heat transfer labels prepared with UV-curable inks will "crack." This cracking is a result of the cross-linking that occurs when the UV-curable inks are cured by exposure to UV radiation. As is well known to those skilled in the art, cross-links are bonds that link one polymer chain to another. When polymer chains are linked together by cross-links, they lose some of their ability to move as individual polymer chains. In other words, the present UV inks that are used in labeling processes are thermoset materials. Thus, the curing process transforms the resins and other components of the UV-curable inks by cross-linking into a rigid structure. Then, as the label including this rigid ink structure is applied to an article (such as a bottle), the label must stretch during its release from any carrier sheet and during application to the contour of the article. While flowable resins (i.e., thermoplastic materials) can move in such fashion, the rigid nature of the thermoset UV inks cannot, and so the UV inks tend to "break," due to the cross-links, which causes a cracking phenomenon to be exhibited in the label. This cracking results in labels that are not aesthetically pleasing, and thus are not useful to a label manufacturer or label customer.

SUMMARY OF THE INVENTION

Certain exemplary aspects of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be explicitly set forth below. However, the at least one UV-curable layer is formulated and/or employed such that the "cracking" effect described above is avoided.

One aspect of the present invention provides a heat transfer label including (a) a support portion and (b) a transfer portion over the support portion, for transfer of the transfer portion from the support portion to an article upon application of heat to the support portion while the transfer portion is placed into contact with the article. The transfer portion includes at least a protective lacquer layer, an ink layer, and an adhesive layer, wherein at least one of the protective lacquer layer, the ink layer, and the adhesive layer is UV-curable. However, the at least one UV-curable layer is formulated and/or employed such that the "cracking" effect described above is avoided. Additionally, the use of at least one UV-curable layer reduces and/or eliminates the amount of solvent-based materials used in the heat transfer label.

In particular, the ink layer may be UV-curable, and may include non-thermoplastic UV-curable inks. Thus, for example, the cured UV inks may be thermoset materials. While this aspect of the present invention uses thermosetting UV-curable inks, the "cracking" effect described above in the Background section of the application is avoided due to at least (1) the particular chemistry of the UV-curable inks, and/or (2) the formulations of other layers of the label surrounding the UV-curable inks. For example, and as will be described in greater detail below, the UV-curable inks may include a combination of polyfunctional acrylate materials selected to provide curing of the layer on press, but which allow for stretch during decoration without cracking. Without being bound by theory, it is believed that the ability to stretch without cracking is provided by reducing the amount of crosslinks formed due to the formulation, while still providing enough crosslinks to ensure sufficient cure.

Determination of such formulation was achieved by evaluating specific products for cure (as measured by loss of carbon-carbon double bonds) and stretch. Thus, while the UV-curable inks of the present invention are thermosetting inks, they do not display the degree of rigidity that is found in current UV-curable inks, and so allow for manipulation of the resulting label without cracking of the ink layer. Factors that may be related to the creation of cracks within the label include the total stretch (applied label length on the article relative to the label length on the printed web) as well as the rate of stretch (how rapidly the label is stretched and applied to the article). Further, in certain embodiments of the present heat transfer label, the UV-curable inks are disposed between a solvent-based protective lacquer layer and a solvent-based adhesive layer. In these embodiments, the two solvent layers sandwiching the UV-curable inks help to provide additional flexibility to the label (which thus helps to avoid the "cracking" effect).

Another aspect of the present invention provides a heat transfer label including (a) a support portion and (b) a transfer portion, wherein the transfer portion includes a plurality of layers, including a tie-coat layer. As is known to those of ordinary skill in the art, a tie-coat layer is generally an intermediate layer that can be used to bond two adjacent layers to one another, or to bond different types of layers to one another. In one embodiment, the tie-coat layer of the heat transfer layer is UV-curable, and can be of a different chemistry from the UV ink layer or layers. Further, a UV-curable tie-coat layer may include UV-curable components that would provide enhanced elasticity.

As described above, one cause of the "cracking" effect is due to a high stretch rate that is used when applying heat transfer labels to articles. However, with the addition of a tie-coat layer, such as a UV-curable tie-coat layer, resistance to cracking is generated during a high stretch rate because the tie-coat layer adds body and strength to the label. In the absence of such a tie-coat layer, at a high stretch rate, the label may rapidly exceed the elasticity of the UV-curable ink layer, thereby leading to cracking. Thus, the thicker the label due to the addition of the tie-coat layer, the better the performance in terms of reducing cracks and allowing for longer stretch. Further, in embodiments including a UV-curable tie-coat layer, although the tie-coat layer is fully cross-linked once it is exposed to UV radiation and cured, it still exhibits the ability to flow with heat because the cross-linkages within the UV tie-coat layer are distant from one another (due to the fewer cross-linkages).

Another way to achieve enhanced elasticity and/or enhanced resistance to cracking is to remove all pigmentation (such as would be found in a UV ink). Another way that the enhanced elasticity may be achieved is to select UV-curable components that have additional functionality, such as may be normally found in adhesive chemistries.

Another aspect of the present invention provides a heat transfer label including (a) a support portion and (b) a transfer portion, wherein the transfer portion includes a plurality of layers, and each of the plurality of layers is UV-curable. However, as described above, the UV components are formulated such that they can "flow" and "stretch" to a degree that allows them to be associated with various articles while avoiding "cracking."

Further, in another aspect of the present invention, flexographic printing techniques may be used for printing one or more of the layers of the transfer portion of the various embodiments of the heat transfer labels. As is known in flexographic techniques, flexible relief plates include image areas raised above non-image areas. The components of the transfer portion, such as lacquer, ink, and adhesive, are each transferred to a flexible relief plate (i.e., lacquer is transferred to a plate, ink is transferred to another plate, and adhesive is transferred to another plate), and from there is transferred to a substrate (i.e., lacquer transferred onto carrier sheet, ink transferred onto lacquer layer, and adhesive transferred onto ink layer). For example, ink is transferred from an ink roll (which is partially submerged in an ink tank) to a second roll whose texture holds a specific amount of ink. A doctor blade then removes excess ink from the second roll before inking the printing plate. The substrate is then positioned between the plate and an impression cylinder to transfer the image. The use of flexographic printing can reduce the costs associated with the more expensive gravure printing, especially as run lengths get shorter. As described above, one reason that flexographic printing has not been pursued aggressively until recently is that the chemistry of the solvent inks are incompatible with the photopolymer plates due to a phenomenon known as "swelling." Basically, when solvent components are applied to the photopolymer plate used in flexographic printing, the components degrade and will be absorbed by the plate. Thus, the plates can only be used for a single run. Thereafter, a new plate would have to be used. Such a rapid turnover in plates is extremely expensive to the point that it is not feasible. However, as the heat transfer labels of the present invention include non-solvent based UV-curable inks, flexographic printing (with its attendant reduction in costs) can now be used in printing heat transfer labels.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One aspect of the present invention provides a heat transfer label including (a) a support portion and (b) a transfer portion over said support portion, for transfer of the transfer portion from the support portion to an article upon application of heat to the support portion while the transfer portion is placed into contact with the article. The transfer portion includes at least a protective lacquer layer, an ink layer, and an adhesive layer, wherein at least one of the protective lacquer layer, the ink layer, and the adhesive layer is UV-curable. However, the at least one UV-curable layer is formulated and/or employed such that the "cracking" effect described above is avoided. Additionally, the use of at least one UV-curable layer reduces and/or eliminates the amount of solvent-based materials used in the heat transfer label.

In certain embodiments, only the ink layer is UV-curable (by including one or more UV-curable inks). In other embodiments, the transfer portion includes a UV-curable ink or inks and a UV-curable protective layer. In still other embodiments, the transfer portion includes a UV-curable ink or inks and a UV-curable adhesive. And in still further embodiments, the transfer portion includes UV-curable protective layers, UV-curable inks, and UV-curable adhesives. Finally, additional embodiments may include an additional tie-coat layer or layers, or a UV-curable tie-coat layer or layers.

UV-curable materials are generally known to those of ordinary skill in the art. For example, certain inks, coatings and adhesives are formulated with photoinitiators and resins. When exposed to the correct energy and irradiance in a certain band of UV light, polymerization occurs, and so the material cures. This reaction may take only a few seconds. The UV sources used may include UV lamps and UV LEDs. Fast processes such as flexographic printing (which may be used for certain layers on certain embodiments of the heat transfer labels) may use high intensity light.

Figure 1:
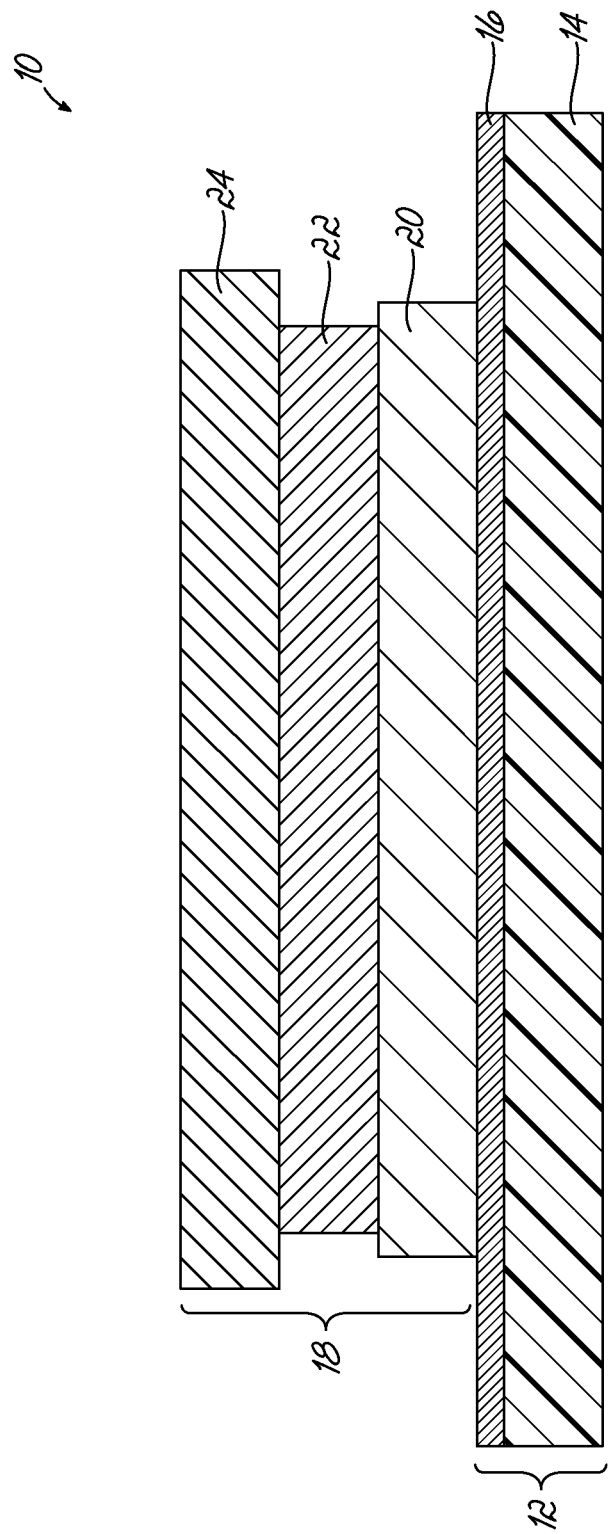
FIG. 1 is a schematic showing a cross-sectional view of a heat transfer label.
Figure 2A:
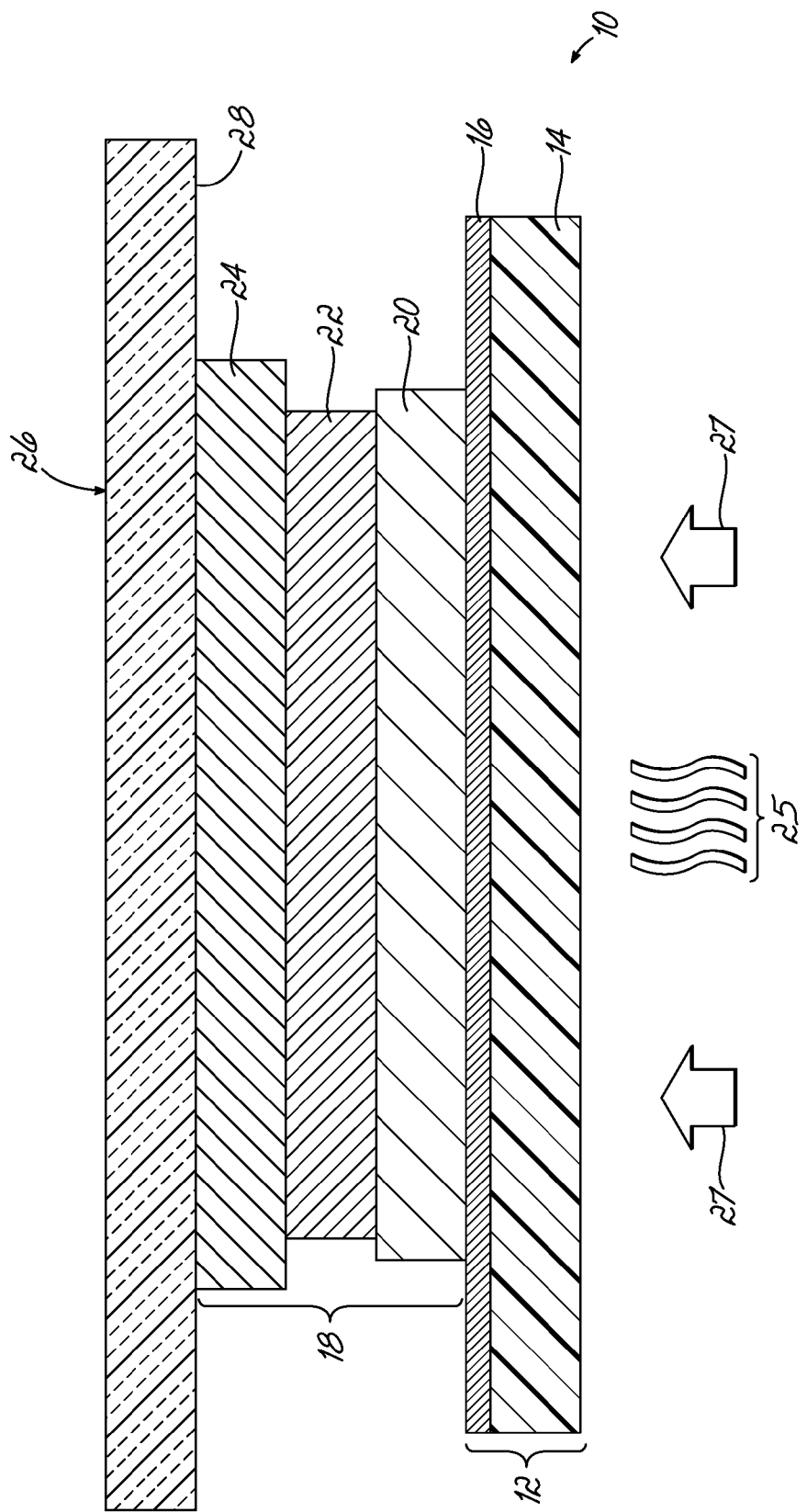
FIG. 2A is a schematic showing a cross-sectional view of a process of transferring a heat transfer label to an article.
Figure 2B:
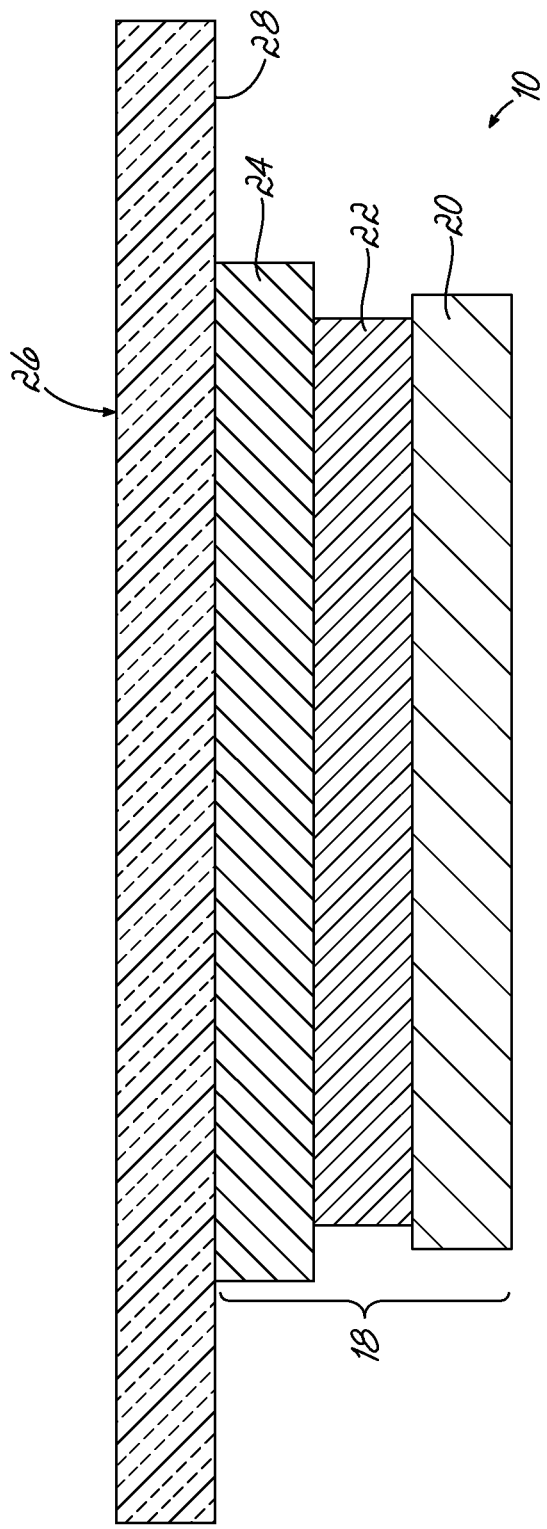
FIG. 2B is a schematic showing a cross-sectional view of a heat transfer label associated with an article.

Referring now to FIGS. 1, 2A, and 2B, the heat transfer labels 10 are multilayered laminates, with each layer having its own function. In general, the labels include a "support portion" 12 (e.g., a carrier sheet 14 having release coating 16—such as wax) and a "transfer portion" 18 (e.g., a protective lacquer layer 20, an ink design layer 22, and an adhesive layer 24). When subjected to heat 25, the wax release coating 16 softens, thereby allowing the transfer portion 18 to be separated from the carrier sheet 14. During this time, the label 10 is placed in confronting relationship with an article 26 and pressure 27 is applied, such that the transfer portion 18 makes direct contact with an outer surface 28 of the article 26. After contact of the transfer portion 18 to the article 26, the carrier sheet 14 is removed, leaving the transfer portion 18 affixed to the article 26 via the adhesive layer 24 of the transfer portion 18. A portion of the wax release coating 16 may split and transfer to the article during the process.

There are several exemplary embodiments of the heat transfer labels 10 described herein. All embodiments include the general support portion 12 and transfer portion 18 described above. The support portion 12 of each embodiment includes a carrier sheet 14, which may have a release coating 16 (e.g., a wax release coating) on one side thereof. The transfer portion 18 of each of the embodiments is positioned adjacent the carrier sheet 14 prior to transfer therefrom. The transfer portion 18 of the embodiments includes at least (1) a UV-curable ink layer 22, and (2) an adhesive layer 24. The transfer portion 18 may also include a protective lacquer layer 20 (that may be either a registered layer or a floodcoated layer). The protective lacquer layer 20 lies directly adjacent the carrier sheet 14 (and any wax coating 16 thereof) prior to transfer of the transfer portion 18 therefrom. The UV-curable ink layer 22 lies adjacent the protective lacquer layer 20 on a side of the protective lacquer layer 20 that is opposite the carrier sheet 14. And the adhesive layer 24 lies adjacent the UV-curable ink layer 22 on a side of the ink layer 22 opposite the protective lacquer layer 20, and is positioned to contact the surface 28 of the article 26 to be labeled. Additional layers may be included within the transfer portion 18.

In particular, the ink layer 22 may be UV-curable, and may include non-thermoplastic UV-curable inks. Thus, for example, the cured UV inks may be thermoset materials. While this aspect of the present invention uses thermosetting UV-curable inks, the "cracking" effect described above in the Background section of the application is avoided due to at least (1) the particular chemistry of the UV-curable inks, and/or (2) the formulations of the other layers of the label 10 surrounding the UV-curable inks. For example, the UV-curable inks may include a combination of polyfunctional acrylate materials (including monomers, oligomers, and photoinitiators) selected to provide curing of the layer on press, but which allow for stretch during decoration without cracking. Without being bound by theory, it is believed that the ability to stretch without cracking is provided by reducing the amount of crosslinks formed due to the formulation, while still providing enough crosslinks to ensure sufficient cure.

Determination of such formulation was achieved by evaluating specific products for cure (as measured by loss of carbon-carbon double bonds) and stretch. Thus, while the UV-curable inks of the present invention are thermosetting inks, they do not display the degree of rigidity that is found in current UV-curable inks, which does allow for manipulation of the resulting label 10 without cracking of the ink layer 22. Factors that may be related to the creation of cracks within the label 10 include the total stretch (applied label length on the article 26 relative to the label length on the printed web) as well as the rate of stretch (how rapidly the label 10 is stretched and applied to the article 26). Further, in one embodiment of a heat transfer label 10 of the present invention, the UV-curable inks are disposed in a layer between a solvent-based protective lacquer layer 20 and a solvent-based adhesive layer 24. In this embodiment, the two solvent layers 20, 24 surrounding the UV-curable inks help to provide additional flexibility to the label 10 (which thus helps to avoid the "cracking" effect).

Figure 3:
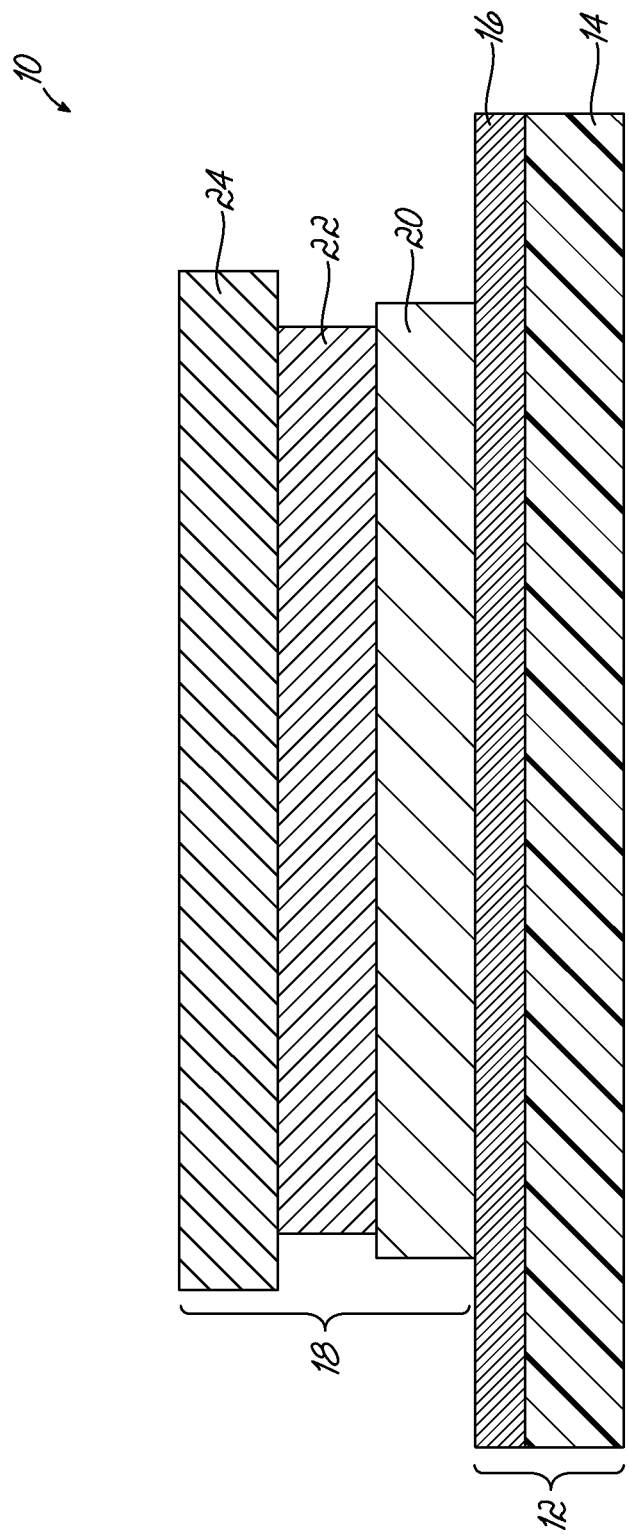
FIG. 3 is a schematic showing a cross-sectional view of an embodiment of the heat transfer label including a UV-curable ink layer, in accordance with principles of the present invention.

Referring now to FIG. 3, one exemplary embodiment of a heat transfer label 10 in accordance with the principles of the present invention is shown. This illustrated embodiment includes a UV-curable ink layer 22, a solvent-based protective lacquer layer 20 and a solvent-based adhesive layer 24.

The inks used in the ink design layer 22 of the embodiment of FIG. 3 of the heat transfer labels 10 of the present invention may be UV-curable inks. In one particular embodiment, the UV-curable ink may include a blend of at least polyfunctional components and photoinitiators. In particular, the polyfunctional components may be polyfunctional acrylates. In one embodiment, the UV-curable ink may include polyfunctional acrylates in an amount of greater than 30% based on the total resin weight. More specifically, one embodiment of a UV-curable ink may include polyfunctional acrylates in an amount of 65 wt %-95 wt %, and a photoinitiator blend in an amount of 1 wt %-20 wt %. An example of such an ink is FP-500 UV process red ink, commercially available from Gotham Ink Corporation of Marlboro, Mass. Another such ink is commercially available from INX International Ink Co., of Schaumberg, Ill., which uses only polyfunctional components in its ink formulations (and thus does not include any monofunctional components) and is offered under the trade name INXFlex2000 UV HTL. However, one of ordinary skill in the art will recognize that these are not the only inks that can be used, and that any UV-curable inks provided exhibiting these same or similar characteristics (i.e., a high percentage of polyfunctional acrylates with a lower percentage of a photoinitiator blend), would suffice.

One advantage of the particular UV inks used in the present invention is the cross-linking that occurs. Cross-links are bonds (covalent or ionic) that link one polymer chain to another. As described above, when polymer chains are linked together by cross-links, they lose some of their ability to move as individual polymer chains. For example, a liquid polymer (where the chains are freely flowing) can be turned into a "solid" or "gel" by cross-linking the chains together. Cross-links are a characteristic property of thermosetting plastic materials.

Thus, when the UV ink (or any other UV component) is cross-linked, the polymer is exposed to the cross-linking method, e.g., exposure to UV radiation. The resulting modification of mechanical properties of the layer (be it ink, lacquer, adhesive, or other layer) depends on the cross-link density. For example, low cross-link densities have higher viscosities. Intermediate cross-link densities transform gummy polymers into materials that have elastomeric properties and potentially high strengths. And high cross-link densities can cause materials to become very rigid or glassy. The present UV-curable inks are formulated (as described above) so they do not exhibit high cross-link densities. Thus, they avoid cracking when used as a component of the heat transfer labels 10.

In the embodiment of the heat transfer label 10 illustrated in FIG. 3 (i.e., a heat transfer label 10 including solvent-based protective lacquer layer 20, UV-curable ink layer 22, and solvent-based adhesive layer 24), the solvent protective lacquer layer 20 may be consistent with typical gravure printing, but modified to allow printing with flexographic printing techniques. Such a solvent protective lacquer 20 may include one or more of acrylic resin, isopropanol and ethyl acetate. More specifically, such a solvent protective lacquer 20 may include 25 wt %-35 wt % acrylic resin, 55 wt %-65 wt % isopropanol, and 5 wt %-15 wt % ethyl acetate. More specifically, one embodiment of a protective lacquer may include 30 wt % acrylic resin (which may be Elvacite 2043 acrylic resin), 60 wt % isopropanol, and 10 wt % ethyl acetate. One such protective lacquer is Gotham PL2 Varnish 46-1333, commercially available from Gotham Ink Corporation, of Marlboro, Mass. However, one of ordinary skill in the art will recognize that this is not the only lacquer that can be used.

Further, during construction of the heat transfer label 10, after deposition of the lacquer composition onto the desired area of the release layer 16, the deposited lacquer layer may be heated, causing the volatile components thereof to evaporate and leaving only the nonvolatile components thereof to make up the protective lacquer layer 20.

The embodiment of the heat transfer label 10 illustrated in FIG. 3 also includes a solvent adhesive. The solvent adhesive used may be consistent with typical gravure printing, but modified to allow printing with flexographic techniques. A formulation for such a solvent adhesive may include one or more of polyamide resins, nitrocellulose, isopropanol, and ethyl acetate. In one embodiment, the solvent-based adhesive may be of a formulation including a polyamide resin in an amount of 30 wt % to 40 wt %, nitrocellulose in an amount of 0.1 wt % to 2 wt %, isopropanol in an amount of 50 wt % to 60 wt %, and ethyl acetate in an amount of 4 wt % to 8 wt %. More specifically, a solvent adhesive for use in the first embodiment of the heat transfer label 10 of the present invention may include 35 wt % polyamide resin, 0.35 wt %-1.4 wt % nitrocellulose, 56 wt %-60 wt % isopropanol, and 4.65 wt %-7.6 wt % ethyl acetate. One particular solvent adhesive is Gotham Ad-Bond Adhesive 46-1335, commercially available from Gotham Ink Corporation, of Marlboro, Mass. However, one of ordinary skill in the art will recognize that this is not the only adhesive that can be used.

The heat transfer label 10 of this embodiment may be prepared as follows: The protective lacquer layer 20 may be laid down on a carrier sheet 14, followed by the UV-curable ink layer 22 being laid down on the protective lacquer layer 20, and then the solvent adhesive layer 24 being laid down on the UV-curable ink layer 22, thereby forming a label 10 with these separate and distinct layers, each layer having its own function. As the inks of the ink layer 22 of the transfer portion 18 are applied, they are exposed to UV radiation provided by ultraviolet light, which cures the UV-curable inks of the ink design layer 22. Subsequent to this curing, the adhesive layer 24 is laid down on top of the already cured ink layer 22. Thus, while the UV-curable ink layer 22 is a cured layer, other layers of the heat transfer labels 10 exhibiting aspects of the present invention are not UV-cured.

Further, the UV ink layer 22 may be applied using flexographic printing techniques. UV components do not present the problem of "swelling" when used in flexographic printing (unlike certain typical rotogravure solvent components). Flexographic printing is a process that is well known to those of ordinary skill in the art. In general, in the flexographic process (used for the UV cured ink), a flexible relief plate (not shown) includes image areas raised above the non-image areas. Ink is transferred from an ink roll (not shown), which is partially submerged in an ink tank to a second roll (not shown) whose texture holds a specific amount of ink. A doctor blade (not shown) then removes excess ink from the second roll before inking the flexible relief plate. The substrate is then positioned between the plate and an impression cylinder (not shown) to transfer the image. While the plate is described as having "image areas," the "image" of those areas may be designed as to provide a floodcoating of the protective lacquer layer onto the substrate.

By using flexographic printing techniques for the designs of the UV ink layer 22, this aspect of the present invention results in cost savings over that of previously manufactured heat transfer labels 10, (or labels 10 including a UV-curable layer). As described above, to date, the component layers of heat transfer labels 10 have been prepared using rotogravure printing techniques, which are very expensive, especially as compared to printing techniques such as flexographic printing. By eliminating gravure printing for the layer of the heat transfer label 10 that includes the most complicated design (i.e., the ink layer 22), great cost savings are realized due to the need not to have to provide multiple and different etched gravure cylinders for different production runs.

As opposed to a flexographically printed UV ink layer, in the embodiment of FIG. 3, the solvent-based protective lacquer layer 20 and solvent-based adhesive layer 24 may be applied via either gravure or flexographic printing techniques. As described above, in rotogravure techniques (which are also well known to those of ordinary skill in the art), the printing plate (not shown) is in cylinder form, and includes wells that are etched or engraved to differing depths and/or sizes to provide the image or images. The component such as the protective lacquer or adhesive is applied directly to the cylinder by rotating in a bath (not shown) where each cell of the image is flooded with the lacquer or adhesive. A doctor blade (not shown) wipes away the excess lacquer or adhesive, and capillary action of the substrate and pressure from impression rollers (not shown) draw the lacquer or adhesive out of the wells and transfer it to the substrate.

Thus, the apparatus (not shown) for a gravure printed protective lacquer layer 20 and/or adhesive layer 24 includes a gravure printing unit (not shown) for a rotary press, with a gravure sleeve (not shown) supplied with lacquer or adhesive from a gravure tray (not shown) and an impression roller (not shown), which lies in confronting relationship to the gravure sleeve, to form a roller gap (not shown) therebetween. When the rotary press is running, a carrier, such as a sheet material, that is to be printed is passed through the roller gap, taking up lacquer or adhesive from the peripheral surface of the gravure sleeve. At the same time, the gravure sleeve rotates in a specified direction opposite to that of the impression roller and its rotational movement is composed of a leading, rotating sector from the printing unit to the roller gap and a trailing rotating sector from the roller gap to the printing unit. Apparatus and techniques for both rotogravure and flexographic printing are common and are very well known to those of ordinary skill in the art.

More specifically, as is well known to those skilled in the art, sleeves, particularly for use in gravure printing, may be made by mechanically working nickel sleeves of relatively long axial length, polishing the sleeves and balancing them. As is well known to those skilled in the art, in such mechanical engraving, a cutting tool (not shown) is used to engrave the cells on the surface of the gravure sleeve. The cutting tool (not shown) used to engrave the cells is normally a pointed diamond stylus, although other tools made of sapphire, carbide, cobalt steel, etc. may be used. Because the tool must make many cells in a sleeve, it must therefore be operated at very high speeds. For example, in a typical 140-line screen, as many as 20,000 cells per square inch may be required. In the engraving of a gravure sleeve, the image, pattern, or copy to be engraved is usually mounted on a copy sleeve, and the copy is optically scanned while the engraving is being performed. However, a copy may be scanned with the corresponding information stored in computer memory, processed, and later used to engrave a sleeve. As described above, the engraving machine may be an electromechanical engraver that uses a diamond stylus to engrave the sleeve. Alternatively, the machine may incorporate electronic means, such as electron beam or laser, for forming the cells within the sleeve. In either case, a series of cavities and/or lines are engraved into the sleeve surface. These sleeves, in one embodiment, may be about 0.009 inch thick. The sleeve, forming a carrier, has a copper layer of about 0.002 inch to about 0.003 inch thickness applied to its circumference, typically by electrolytic deposition. This layer is smooth at the outer circumference. Thus, during deposition, it may be continuously compacted by a jewel roller, for example, and rolling with the sleeve on which the copper layer is being deposited. The final layer may be a chrome plating of about 5-8 microns thickness. After the customary photolithographic processes, the depressions within the outer layer are etched in by a chemical etch. The depth of the depressions or engravings is generally about 0.02 mm to 0.03 mm, although they can be any desired depth. Such sleeves are commercially available from Stork Prints America, Inc. of Charlotte, N.C.

As described above, the solvent protective lacquer layer 20 and the solvent adhesive layer 24 may alternatively be printed using flexographic techniques (such as are described above with respect to the UV ink layer). As will be recognized by those of ordinary skill in the art, not as much cost savings are realized by switching from gravure to flexographic printing for the adhesive and protective lacquer layers 24, 20. As is known to those of ordinary skill in the art, adhesive and protective lacquer layers 24, 20 are often applied as registered, flood coated, or patterned layers (rather than as design layers like ink design layers). Thus, the cost for etching a gravure cylinder for an adhesive or protective lacquer is not as high because it does not require intricate etchings. Further, gravure cylinders for adhesives and protective lacquers may potentially be used for one another, and a particular adhesive or protective lacquer gravure cylinder may be used for more than one production run (as the registration, pattern, or flood-coating may be able to be used for the printing of more than one label 10).

Thus, there may be two different varieties of the embodiment illustrated in FIG. 3. In the first, each of the solvent protective lacquer layer 20, UV-curable ink layer 22, and solvent adhesive layer 24 is applied via flexographic printing techniques. In the second, only the UV-curable ink layer 22 is printed using flexographic techniques (as described above), while the protective lacquer layer 20 and the solvent adhesive layer 24 are applied using rotogravure techniques.

Figure 4:
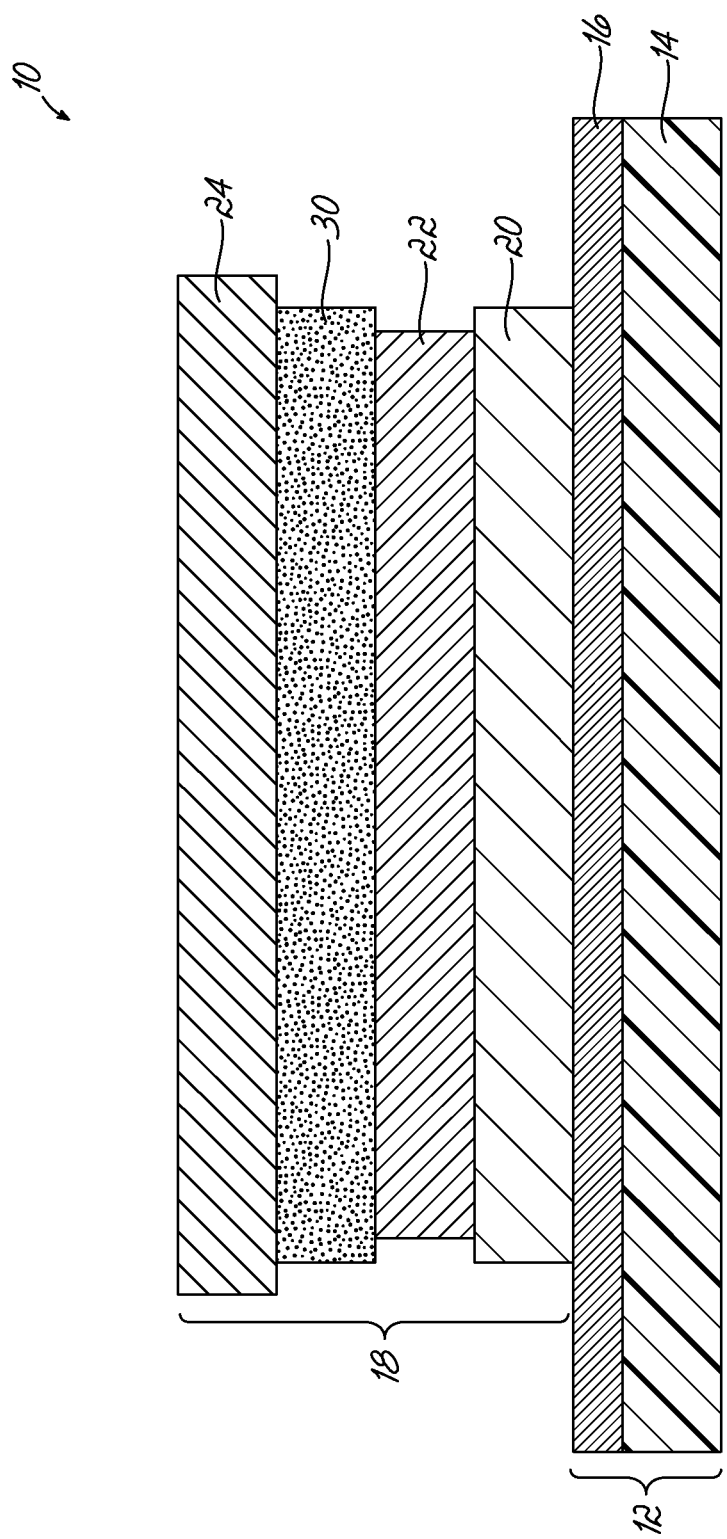
FIG. 4 is a schematic showing a cross-sectional view of an embodiment of the heat transfer label including a UV-curable tie-coat layer, in accordance with principles of the present invention.

Referring now to FIG. 4, another exemplary embodiment of a heat transfer label 10 in accordance with the principles of the present invention is shown. In this embodiment, a UV-curable tie-coat layer 30 is present in the transfer portion 18, which also includes a protective lacquer layer 20, a UV-curable ink layer 22, and an adhesive layer 24. The UV-curable tie-coat layer 30 may be disposed between the solvent-based layers 20, 24 (i.e., protective lacquer and/or adhesive) as one of the UV ink layers 22. Alternatively, the UV-curable tie-coat layer 30 may not include any ink or ink components, and thus would not operate also as an ink layer.

The UV-curable tie-coat layer 30 can be a different chemistry from the UV ink layers 22 and may include UV-curable components that would provide enhanced elasticity. As described above, one cause of the "cracking" effect is due to a high stretch rate that is used when applying heat transfer labels 10 to articles 26. However, with the addition of a UV-curable tie-coat layer 30, resistance to cracking is generated during a high stretch rate because the UV-curable tie-coat layer 30 adds body and strength to the label 10. In the absence of such a UV-curable tie-coat layer 30, at a high stretch rate, the label 10 may rapidly exceed the elasticity of the UV-curable ink layer 22, thereby leading to cracking. Thus, due to the addition of the UV tie-coat layer 30, the label 10 achieves better performance in terms of reducing cracks and allowing for longer stretch. Further, although the UV-curable tie-coat layer 30 is fully cross-linked once it is exposed to UV radiation and cured, it still exhibits the ability to flow with heat because crosslinkages within the UV-curable tie-coat layer are distant from one another (due to the few cross-linkages). Another way to achieve enhanced elasticity and/or enhanced resistance to cracking is to remove all pigmentation (such as from a UV ink). Another is to add functionality normally found in adhesive chemistries (such as UV lamination adhesive, UV heat activated adhesive, and the like). So, although the UV tie-coat layer 30 is fully cross-linked once exposed to UV radiation, it exhibits the ability to flow with heat because the cross-linkages are distant from one another. Without being bound by theory, it is believed that the UV tie-coat layer 30 acts to "bind" together the layers so that they stretch and move with a consistency not observed when the tie-coat is absent. One such UV tie-coat layer 30 includes FP-500 NUV-75, a medium viscosity pale liquid having multi and mono functional acrylate oligomers and photo initiators commercially available from Gotham Ink Corporation of Marlboro, Mass.

A suitable UV tie-coat layer 30 may also be made by combining components of ink chemistry. An example of one such tie-coat layer 30 can be made by combining UV ink extender in an amount of 50-99% with a UV cured heat activated adhesive in an amount of 1-50%. One such UV ink extender is INXFlex 2000 UV ITX Free Extender commercially available from INX International Ink Co., of Schaumberg, Ill. Another such UV cured heat activated adhesive is JRX-1253, commercially available from Dyna-Tech Adhesives and Coatings, Inc., of Grafton, W. Va. JRX-1253 adhesive is a medium viscosity pale liquid with a sweet odor.

It is not considered combustible, having a flash point of greater than 200 F. JRX-1253 adhesive polymerizes when subjected to heat and when subjected to UV radiation. However, one of ordinary skill in the art will recognize that these are not the only tie-coats that can be used, and that any UV-curable tie-coats providing similar characteristics would suffice.

Apart from the enhanced stretch, and avoidance of cracking, which is provided by the use of the UV-curable tie-coat layer 30, the position of the tie-coat layer 30 may be chosen to reduce yellowing and discoloration. This can be achieved by providing the tie-coat layer 30 within the UV-curable inks, and after the white layer (such that it is "behind" the label 10 when viewed by the consumer).

This embodiment of the heat transfer label 10 also includes a solvent protective lacquer layer 20. The solvent protective lacquer layer 20 may be consistent with typical gravure printing, but modified to allow printing with flexographic printing techniques. Such a solvent protective lacquer may include one or more of acrylic resin, isopropanol and ethyl acetate. More specifically, such a solvent protective lacquer 20 may include 25 wt %-35 wt % acrylic resin, 55 wt %-65 wt % isopropanol, and 5 wt %-15 wt % ethyl acetate. More specifically, one embodiment of a protective lacquer may include 30 wt % acrylic resin (which may be Elvacite 2043 acrylic resin), 60 wt % isopropanol, and 10 wt % ethyl acetate. One such protective lacquer is Gotham PL2 Varnish 46-1333, commercially available from Gotham Ink Corporation, of Marlboro, Mass. However, one of ordinary skill in the art will recognize that this is not the only lacquer that can be used.

This embodiment of the heat transfer label 10 also includes a UV-curable ink or inks. These may be similar to, or the same as, the UV-curable inks disclosed with respect to the first embodiment of the heat transfer label 10 of the present invention. As described above, the inks used in the ink design layer 22 of both species of the first embodiment of the heat transfer labels 10 of the present invention are UV-curable inks. In one particular embodiment, the UV-curable ink includes polyfunctional components. More specifically, the UV-curable ink may include a blend of at least polyfunctional components and photoinitiators. In particular, the polyfunctional components may be polyfunctional acrylates. More specifically, one UV-curable ink may include polyfunctional acrylates in an amount of 65 wt %-95 wt %, and a photoinitiator blend in an amount of 1 wt %-20 wt %. An example of such an ink is Gotham's FP-500 UV process red ink, commercially available from Gotham Ink Corporation of Marlboro, Mass. Another such ink is commercially available from INX International Ink Co., of Schaumberg, Ill., which uses only polyfunctional components in its ink formulations (and thus does not include any monofunctional components) and is offered under the trade name INXFlex2000 UV HTL. However, one of ordinary skill in the art will recognize that these are not the only inks that can be used, and that any UV-curable inks provided exhibiting these same or similar characteristics (i.e., a high percentage of polyfunctional acrylates with a lower percentage of a photoinitiator blend), would suffice.

Finally, this embodiment of the heat transfer label 10 includes a solvent adhesive layer 24. The solvent adhesive of the second embodiment may the same as, or similar to, the solvent adhesive used in the first embodiment of the heat transfer label 10. The solvent adhesive used may be consistent with typical gravure printing, but modified to allow printing with flexographic techniques. A formulation for such a solvent adhesive may include one or more of polyamide resins, nitrocellulose, isopropanol, and ethyl acetate. In one embodiment, the solvent-based adhesive may be of a formulation including a polyamide resin in an amount of 30 wt % to 40 wt %, nitrocellulose in an amount of 0.1 wt % to 2 wt %, isopropanol in an amount of 50 wt % to 60 wt %, and ethyl acetate in an amount of 4 wt % to 8 wt %. More specifically, a solvent adhesive for use in the first embodiment of the heat transfer label 10 of the present invention may include 35 wt % polyamide resin, 0.35 wt %-1.4 wt % nitrocellulose, 56 wt %-60 wt % isopropanol, and 4.65 wt %-7.6 wt % ethyl acetate. One particular solvent adhesive is Gotham Ad-Bond Adhesive 46-1335, commercially available from Gotham Ink Corporation, of Marlboro, Mass. However, one of ordinary skill in the art will recognize that this is not the only adhesive than can be used.

Figure 4A:
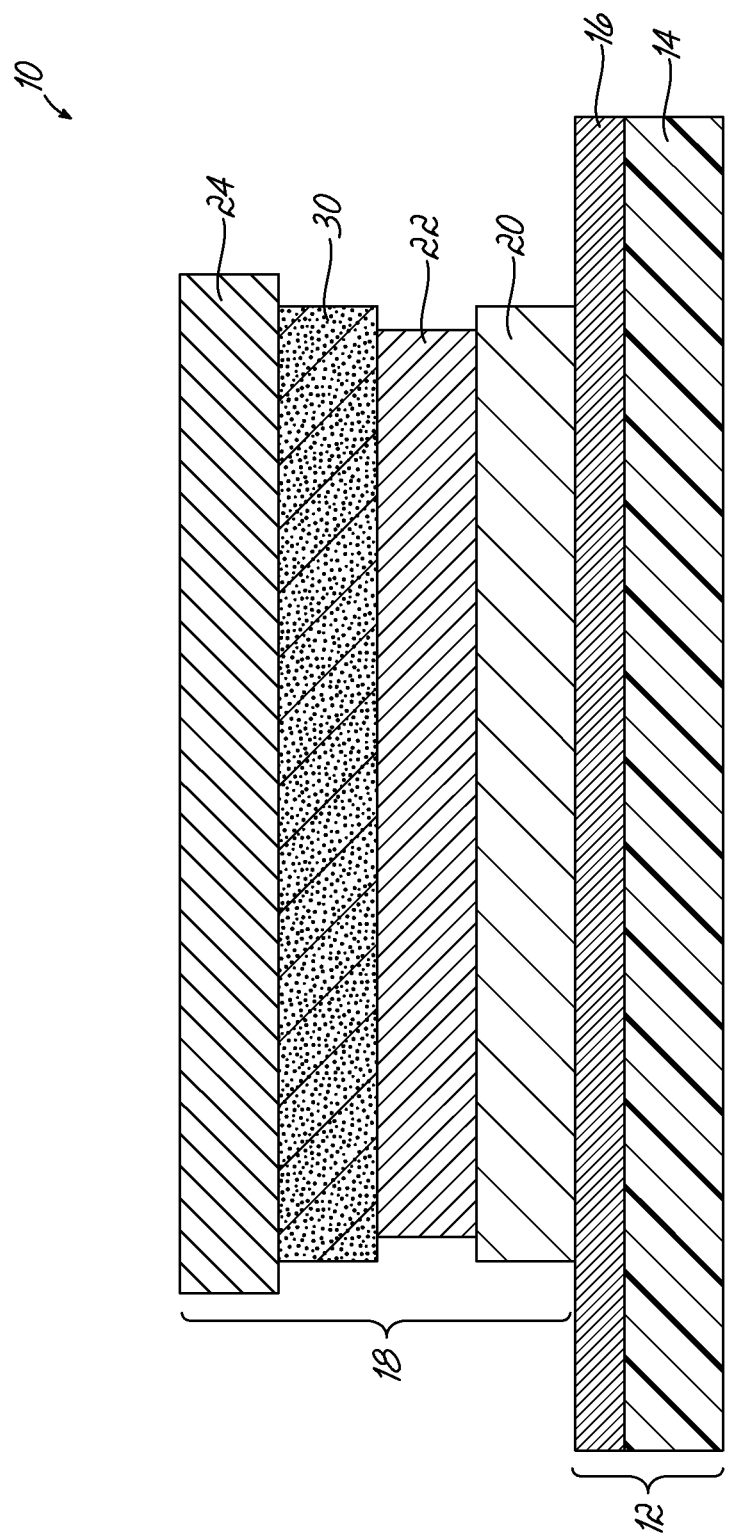
FIG. 4A is a schematic showing a cross-sectional view of an embodiment of the heat transfer label including a tie-coat layer, in accordance with the principles of the present invention.

Referring now to FIG. 4A, another exemplary embodiment of a heat transfer label 10 in accordance with the principles of the present invention is shown. In this embodiment, a tie-coat layer 30 is present in the transfer portion 18, which also includes a protective lacquer layer 20, a UV-curable ink layer 22, and an adhesive layer 24. In this embodiment, the tie-coat layer 30 is not a UV-curable tie-coat layer.

The tie-coat layer 30 may provide enhanced elasticity to the label 10 including a UV ink layer or layers 22. As described above, one cause of the "cracking" effect is due to a high stretch rate that is used when applying heat transfer labels 10 to articles 26. However, with the addition of a tie-coat layer 30, resistance to cracking is generated during a high stretch rate because the tie-coat layer 30 adds body and strength to the label 10. In the absence of such a tie-coat layer 30, at a high stretch rate, the label 10 may rapidly exceed the elasticity of the UV-curable ink layer 22, thereby leading to cracking. Thus, due to the addition of the tie-coat layer 30, the label 10 achieves better performance in terms of reducing cracks and allowing for longer stretch. Without being bound by theory, it is believed that the tie-coat layer 30 acts to "bind" together the layers so that they stretch and move with a consistency not observed when the tie-coat is absent.

A suitable tie-coat layer 30 may be a solvent based tie-coat layer. Such a layer can be applied via rotogravure or flexographic printing processes. Alternatively, an emulsion may be used for the non-UV-curable tie-coat layer.

Apart from the enhanced stretch, and avoidance of cracking, which is provided by the use of the tie-coat layer 30, the position of the tie-coat layer 30 may be chosen to reduce yellowing and discoloration. This can be achieved by providing the tie-coat layer 30 within the UV-curable inks, and after the white layer (such that it is "behind" the label 10 when viewed by the consumer).

The embodiment of the heat transfer label 10 of FIG. 4A also includes a solvent protective lacquer layer 20. The solvent protective lacquer layer 20 may be consistent with typical gravure printing, but modified to allow printing with flexographic printing techniques. Such a solvent protective lacquer may include one or more of acrylic resin, isopropanol and ethyl acetate. More specifically, such a solvent protective lacquer 20 may include 25 wt %-35 wt % acrylic resin, 55 wt %-65 wt % isopropanol, and 5 wt %-15 wt % ethyl acetate. More specifically, one embodiment of a protective lacquer may include 30 wt % acrylic resin (which may be Elvacite 2043 acrylic resin), 60 wt % isopropanol, and 10 wt % ethyl acetate. One such protective lacquer is Gotham PL2 Varnish 46-1333, commercially available from Gotham Ink Corporation, of Marlboro, Mass. However, one of ordinary skill in the art will recognize that this is not the only lacquer that can be used.

This embodiment of the heat transfer label 10 also includes a UV-curable ink or inks. These may be similar to, or the same as, the UV-curable inks disclosed with respect to the first embodiment of the heat transfer label 10 of the present invention. As described above, the inks used in the ink design layer 22 of both species of the first embodiment of the heat transfer labels 10 of the present invention are UV-curable inks. In one particular embodiment, the UV-curable ink includes polyfunctional components. More specifically, the UV-curable ink may include a blend of at least polyfunctional components and photoinitiators. In particular, the polyfunctional components may be polyfunctional acrylates. More specifically, one UV-curable ink may include polyfunctional acrylates in an amount of 65 wt %-95 wt %, and a photoinitiator blend in an amount of 1 wt %-20 wt %. An example of such an ink is Gotham's FP-500 UV process red ink, commercially available from Gotham Ink Corporation of Marlboro, Mass. Another such ink is commercially available from INX International Ink Co., of Schaumberg, Ill., which uses only polyfunctional components in its ink formulations (and thus does not include any monofunctional components) and is offered under the trade name INXFlex2000 UV HTL. However, one of ordinary skill in the art will recognize that these are not the only inks that can be used, and that any UV-curable inks provided exhibiting these same or similar characteristics (i.e., a high percentage of polyfunctional acrylates with a lower percentage of a photoinitiator blend), would suffice.

Finally, this embodiment of the heat transfer label 10 includes a solvent adhesive layer 24. The solvent adhesive of the second embodiment may the same as, or similar to, the solvent adhesive used in the first embodiment of the heat transfer label 10. The solvent adhesive used may be consistent with typical gravure printing, but modified to allow printing with flexographic techniques. A formulation for such a solvent adhesive may include one or more of polyamide resins, nitrocellulose, isopropanol, and ethyl acetate. In one embodiment, the solvent-based adhesive may be of a formulation including a polyamide resin in an amount of 30 wt % to 40 wt %, nitrocellulose in an amount of 0.1 wt % to 2 wt %, isopropanol in an amount of 50 wt % to 60 wt %, and ethyl acetate in an amount of 4 wt % to 8 wt %. More specifically, a solvent adhesive for use in the first embodiment of the heat transfer label 10 of the present invention may include 35 wt % polyamide resin, 0.35 wt %-1.4 wt % nitrocellulose, 56 wt %-60 wt % isopropanol, and 4.65 wt %-7.6 wt % ethyl acetate. One particular solvent adhesive is Gotham Ad-Bond Adhesive 46-1335, commercially available from Gotham Ink Corporation, of Marlboro, Mass. However, one of ordinary skill in the art will recognize that this is not the only adhesive than can be used.

Figure 5:
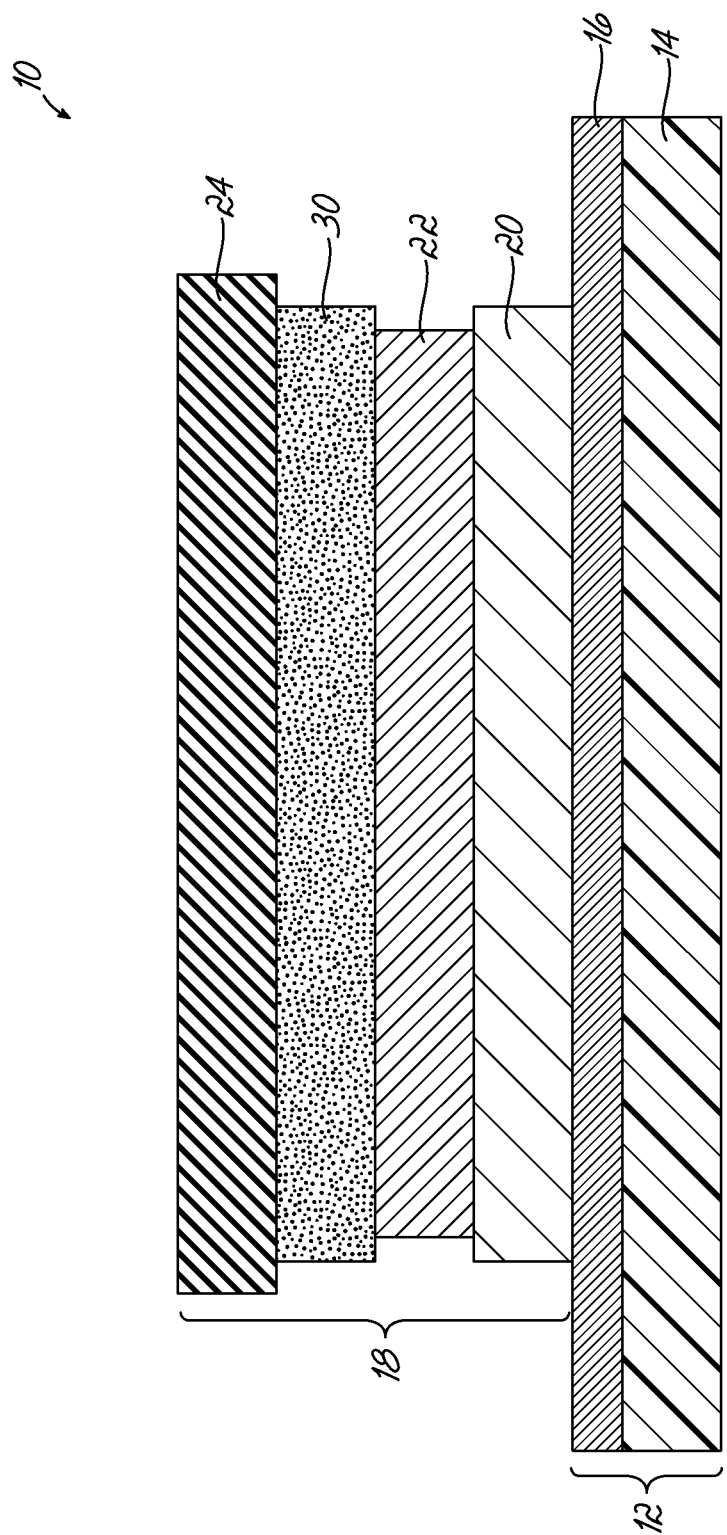
FIG. 5 is a schematic showing a cross-sectional view of an embodiment of the heat transfer label including a UV-curable tie-coat, ink, and adhesive layers, and a solvent protective lacquer layer in accordance with principles of the present invention.

Referring now to FIG. 5, another exemplary embodiment of a heat transfer label 10 in accordance with the principles of the present invention is shown. In this embodiment of the heat transfer labels 10 exhibiting aspects of the present invention, the transfer portion 18 of both embodiments includes (1) a solvent protective lacquer layer 20 (that is either a registered layer or a floodcoated layer), (2) a UV-curable ink, (3) a UV-curable tie-coat layer 30, and (4) a UV printed heat activated adhesive. In this embodiment, the construction includes a solvent protective lacquer in combination with UV cured layers. The particular selection of the solvent protective lacquer is beneficial in that it has good adhesion to the wax layer 16 and helps to prevent blocking in the printed roll.

Ultraviolet (UV) light curing adhesives, also known as light curing materials (LCM), have become popular within the manufacturing sector due to their rapid curing time and strong bond strength. Light curing adhesives can cure in as little as a second and many formulations can bond dissimilar substrates (materials) and withstand harsh temperatures. Unlike traditional adhesives, UV light curing adhesives not only bond materials together but they can also be used to seal and coat products.

In this embodiment of the heat transfer labels 10, the adhesive layer 24 is UV cured following the printing step. As such, the label 10 can be wound in roll form without blocking (due to tackiness). During the decoration step, heat (or heat and pressure) is applied and the adhesive becomes soft, fluid, and tacky just prior to application at which point the label 10 bonds to the substrate.

One such UV-curable heat activated adhesive is JRX-1253, commercially available from Dyna-Tech Adhesives and Coatings, Inc., of Grafton, W. Va. JRX-1253 adhesive is a medium viscosity pale liquid with a sweet odor. It is not considered combustible, having a flash point of greater than 200 F. JRX-1253 adhesive polymerizes when subjected to heat and when subjected to UV radiation. Another such heat activated UV-curable adhesive is HS30 and is commercially available from Actega Radcure Inc. of Wayne, N.J. Per the MSDS, HS30 adhesive is used as a UV/EB curable adhesive, primer, coating. Another such heat activated UV cured adhesive is FP-500 NUV85 from Gotham Ink Corporation of Marlboro, Mass. FP-500 NUV85 adhesive is a proprietary mixture of materials. However, those of ordinary skill in the art will recognize that these are not the only UV-curable adhesives that can be used, and that other UV-curable adhesives providing similar characteristics can be used.

This embodiment of the heat transfer label 10 also includes a solvent protective lacquer layer 20. The solvent protective lacquer layer 20 may be consistent with typical gravure printing, but modified to allow printing with flexographic printing techniques. Such a solvent protective lacquer may include one or more of acrylic resin, isopropanol and ethyl acetate. More specifically, one embodiment of a protective lacquer may include 30 wt % acrylic resin (which may be Elvacite 2043 acrylic resin), 60 wt % isopropanol, and 10 wt % ethyl acetate. More specifically, such a solvent protective lacquer 20 may include 25 wt %-35 wt % acrylic resin, 55 wt %-65 wt % isopropanol, and 5 wt %-15 wt % ethyl acetate. One such protective lacquer is Gotham PL2 Varnish 46-1333, commercially available from Gotham Ink Corporation, of Marlboro, Mass.

This embodiment of the heat transfer label 10 also includes a UV-curable ink or inks. These may be similar to, or the same as, the UV-curable inks disclosed with respect to the first and second embodiments of the heat transfer label 10 of the present invention. As described above, the inks used in the ink design layer 22 of both species of the first embodiment of the heat transfer labels 10 of the present invention are UV-curable inks. In one particular embodiment, the UV-curable ink includes polyfunctional components. More specifically, the UV-curable ink may include a blend of at least polyfunctional components and photoinitiators. In particular, the polyfunctional components may be polyfunctional acrylates. More specifically, one UV-curable ink may include polyfunctional acrylates in an amount of 65 wt %-95 wt %, and a photoinitiator blend in an amount of 1 wt %-20 wt %. An example of such an ink is Gotham's FP-500 UV process red ink, commercially available from Gotham Ink Corporation of Marlboro, Mass. Another such ink is commercially available from INX International Ink Co., of Schaumberg, Ill., which uses only polyfunctional components in its ink formulations (and thus does not include any monofunctional components) and is offered under the trade name INXFlex2000 UV HTL. However, one of ordinary skill in the art will recognize that these are not the only inks that can be used, and that any UV-curable inks provided exhibiting these same or similar characteristics (i.e., a high percentage of polyfunctional acrylates with a lower percentage of a photoinitiator blend), would suffice.

In this embodiment, a UV-curable tie-coat layer 30 is present in the transfer portion 18, which also includes a protective lacquer layer 20, a UV-curable ink layer 22, and an adhesive layer 24. The UV-curable tie-coat layer 30 may be disposed between the solvent-based layers 20, 24 (i.e., protective lacquer and/or adhesive) as one of the UV ink layers 22. The UV-curable tie-coat layer 30 can be a different chemistry from the UV ink layers 22 and may include UV-curable components that would provide enhanced elasticity. One such UV tie-coat layer 30 is FP-500 NUV-75, a medium viscosity pale liquid having multi and mono functional acrylate oligomers and photo initiators commercially available from Gotham Ink Corporation of Marlboro, Mass.

A suitable UV tie-coat layer 30 may also be made by combining components of ink chemistry. An example of one such tie-coat layer 30 can be made by combining UV ink extender in an amount of 50-99% with a UV cured heat activated adhesive in an amount of 1-50%. One such UV ink extender is INXFlex 2000 UV ITX Free Extender commercially available from INX International Ink Co., of Schaumberg, Ill. Another such UV cured heat activated adhesive is JRX-1253, commercially available from Dyna-Tech Adhesives and Coatings, Inc., of Grafton, W. Va. JRX-1253 is a medium viscosity pale liquid with a sweet odor. It is not considered combustible, having a flash point of greater than 200 F. JRX-1253 adhesive polymerizes when subjected to heat and when subjected to UV radiation. However, one of ordinary skill in the art will recognize that these are not the only tie-coats that can be used, and that any UV-curable tie-coats providing similar characteristics would suffice.

Apart from the enhanced stretch, and avoidance of cracking, which is provided by the use of the UV-curable tie-coat layer 30, the position of the tie-coat layer 30 may be chosen to reduce yellowing and discoloration. This can be achieved by providing the tie-coat layer 30 within the UV-curable inks, and after the white layer (such that it is "behind" the label when viewed by the consumer).

Figure 6:
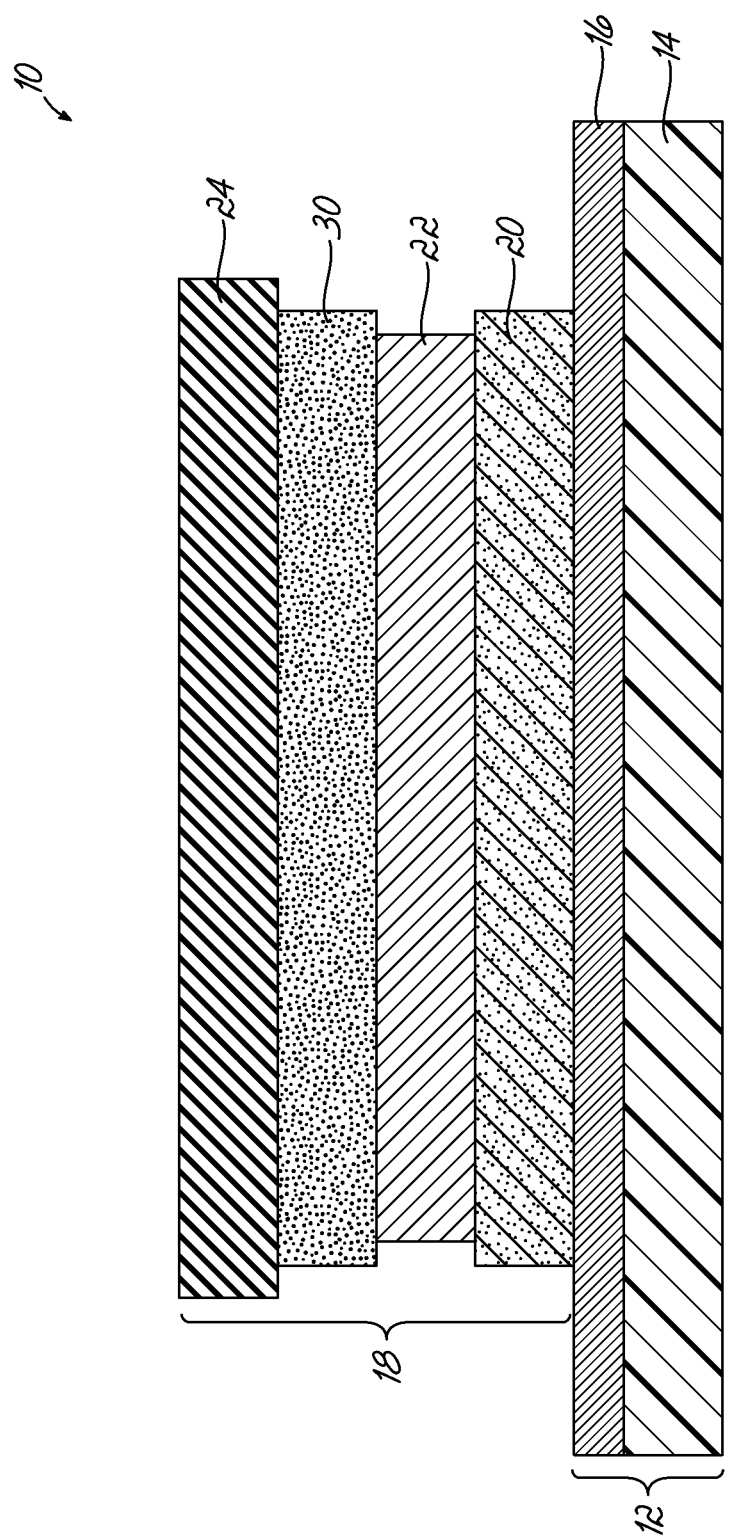
FIG. 6 is a schematic showing a cross-sectional view of an embodiment of the heat transfer label including all layers of the transfer portion being UV-curable layers, in accordance with principles of the present invention.

Referring now to FIG. 6, another exemplary embodiment of a heat transfer label 10 in accordance with the principles of the present invention is shown. In this embodiment of the heat transfer labels 10 exhibiting aspects of the present invention, the transfer portion 18 includes (1) a UV cured protective lacquer layer 20 (that is either a registered layer or a floodcoated layer), (2) a UV-curable ink, (3) a UV-curable tie-coat layer 30, and (4) a UV cured heat activated adhesive. Thus, in this embodiment, all of the components of the label construction are UV cured which facilitates printing via flexographic techniques. This provides certain advantages in that the relatively expensive engraved cylinders used for typical gravure printing are not required. The specific UV heat activated adhesive is selected to provide adhesion to the decorated container.

The construction includes a UV-curable protective layer 20 applied onto the wax layer 16. The UV-curable protective layer 20 is specifically formulated to have good bond to the wax layer 16. One such UV cured protective layer 20 includes FP-500 NUV98 lacquer available from Gotham Ink Corporation of Marlboro, Mass. Another such UV cured protective layer 20 includes X-14JA-145-A lacquer available from Actega Radcure Inc. of Wayne, N.J.

As described above, the inks used in the ink design layer 22 of both species of this embodiment of the heat transfer labels 10 of the present invention are UV-curable inks. In one particular embodiment, the UV-curable ink includes polyfunctional components. More specifically, the UV-curable ink may include a blend of at least polyfunctional components and photoinitiators. In particular, the polyfunctional components may be polyfunctional acrylates. More specifically, one UV-curable ink may include (1) polyfunctional acrylates in an amount of 65 wt %-95 wt %, and (2) a photoinitiator blend in an amount of 1 wt %-20 wt %. An example of such an ink is Gotham's FP-500 UV process red ink, commercially available from Gotham Ink Corporation of Marlboro, Mass. Another such ink is commercially available from INX International Ink Co., of Schaumberg, Ill., which uses only polyfunctional components in its ink formulations (and thus does not include any monofunctional components) and is offered under the trade name INXFlex2000 UV HTL. However, one of ordinary skill in the art will recognize that these are not the only inks that can be used, and that any UV-curable inks provided exhibiting these same or similar characteristics (i.e., a high percentage of polyfunctional acrylates with a lower percentage of a photoinitiator blend), would suffice.

In this embodiment, a UV-curable tie-coat layer 30 is present in the transfer portion 18, which also includes a protective lacquer layer 20, a UV-curable ink layer 22, and an adhesive layer 24. The UV-curable tie-coat layer 30 may be disposed between the solvent-based layers 20, 24 (i.e., protective lacquer and/or adhesive) as one of the UV ink layers 22. The UV-curable tie-coat layer 30 can be a different chemistry from the UV ink layers 22 and may include UV-curable components that would provide enhanced elasticity. One such UV tie-coat layer 30 is FP-500 NUV-75, a medium viscosity pale liquid having multi and mono functional acrylate oligomers and photo initiators commercially available from Gotham Ink Corporation of Marlboro, Mass.

A suitable UV tie-coat layer 30 may also be made by combining components of ink chemistry. An example of one such tie-coat layer 30 can be made by combining UV ink extender in an amount of 50-99% with a UV cured heat activated adhesive in an amount of 1-50%. One such UV ink extender is INXFlex 2000 UV ITX Free Extender commercially available from INX International Ink Co., of Schaumberg, Ill. Another such UV cured heat activated adhesive is JRX-1253, commercially available from Dyna-Tech Adhesives and Coatings, Inc., of Grafton, W. Va. JRX-1253 adhesive is a medium viscosity pale liquid with a sweet odor. It is not considered combustible, having a flash point of greater than 200 F. JRX-1253 adhesive polymerizes when subjected to heat and when subjected to UV radiation. However, one of ordinary skill in the art will recognize that these are not the only tie-coats that can be used, and that any UV-curable tie-coats providing similar characteristics would suffice.

Apart from the enhanced stretch, and avoidance of cracking, which is provided by the use of the UV-curable tie-coat layer 30, the position of the tie-coat layer 30 may be chosen to reduce yellowing and discoloration. This can be achieved by providing the tie-coat layer 30 within the UV-curable inks, and after the white layer (such that it is "behind" the label when viewed by the consumer).

The practice of the invention is further illustrated by the following non-limiting Examples.

Example 1

A heat transfer label was formed by printing the components of the transfer portion as described in the embodiment of FIG. 3. A solvent protective lacquer, Gotham PL2 Varnish 46-1333, was applied to a wax release paper using conventional flexographic printing techniques, well known to those of ordinary skill in the art. The solvent lacquer was dried in a conventional enclosed hot air dryer, well known to those of ordinary skill in the art.

A design was then printed over the protective lacquer layer using Gotham Ink Company FP-500 NUV series UV-curable inks using conventional flexographic printing techniques. 600 W GEW UV lamps were used after the application of each ink layer to cure the ink. Complete cure of the ink was observed with no tracking or smudging. A solvent adhesive layer, Gotham Ad-Bond Adhesive 46-1335 (an adhesive), was then overprinted on the design. The solvent adhesive layer 24 was dried in a conventional enclosed hot air dryer. The resulting web was wound into roll form and utilized during the decorating step.

The decorating step utilized a conventional TD1000 heat transfer decorator, well known to those of ordinary skill in the art, commercially available from Concept Machine and Design of Burlington, Ky. The resulting heat transfer laminate was brought into contact with a polyethylene bottle whose surface had been flame treated to render it receptive to adhesives. The desired heat transfer was accomplished using conventional application techniques, well known to those of ordinary skill in the art, including a post flaming step.

Adhesion to the bottle was found to be excellent as measured using a conventional tape test technique with both #810 and #610 tape. A "tape test" is well known to those of ordinary skill in the art and involves applying a strip of adhesive tape (such as #610 adhesive tape, which is commercially available from 3M) to the label, removing the strip of tape from the container, and then visually assessing the integrity of the label.

The decorating window (that is, the available range of temperatures at which the label could be applied and meet performance criteria) was very wide. Preheat temperatures ranging from 150° F. to 250° F. and Platen temperatures ranging from 325° F. to 425° F. were sufficient to ensure excellent adhesion. Some visual distortion to the label was observed at preheat temperatures exceeding 225° F. The stretch point prior to cracking was tested and found to be 3%. During decoration at stretch rates of 2-3%, no vertical gathers were observed. Labels that were subjected to 5 minute dwell period on the preheater did not show visible signs of yellowing.

Example 2

A heat transfer label was formed by printing the components of the transfer portion as described in the embodiment of FIG. 4. A solvent protective lacquer, Gotham PL2 Varnish 46-1333, was applied to a wax release paper using conventional flexographic printing techniques. The solvent lacquer was dried in a conventional enclosed hot air dryer.

A design was then printed over the protective lacquer layer using Gotham Ink Company FP-500 NUV series UV-curable inks using conventional flexographic printing techniques. 600 W GEW UV lamps were used after the application of each ink layer to cure the ink. Complete cure of the ink was observed with no tracking or smudging.

A UV tie-coat layer, Gotham FP-500 NUV75, was then overprinted on the design. 600 W GEW UV lamps were used to cure the tie-coat layer. Complete cure of the layer was observed with no tracking or smudging.

A solvent adhesive layer, Gotham Ad-Bond Adhesive 46-1335 (an adhesive), was then overprinted on the design. The solvent adhesive layer was dried in a conventional enclosed hot air dryer. The resulting web was wound into roll form and utilized during the decorating step.

The decorating step utilized a conventional TD1000 heat transfer decorator, commercially available from Concept Machine and Design of Burlington, Ky. The resulting heat transfer laminate was brought into contact with a polyethylene bottle whose surface had been flame treated to render it receptive to adhesives. The desired heat transfer was accomplished using conventional application techniques, including a post flaming step.

Adhesion to the bottle was found to be excellent as measured using a conventional tape test technique with both #810 and #610 tape.

The decorating window (that is, the available range of temperatures at which the label could be applied and meet performance criteria) was very wide. Preheat temperatures ranging from 150° F. to 250° F. and Platen temperatures ranging from 325° F. to 425° F. were sufficient to ensure excellent adhesion. No visual distortion to the label was observed even when preheat temperatures exceeding 250° F. The stretch point prior to cracking was tested and found to be 6.5%. During decoration at stretch rates of 2-3%, no vertical gathers were observed. Labels that were subjected to 5 minute dwell period on the preheater did not show visible signs of yellowing.

Labels produced according to Example 2 have been applied to 3 gallon and 5 gallon pail containers. These containers are challenging to decorate because the label is stretched as much as 8 percent (due to the taper of the container). No cracking of the labels was observed.

Labels produced according to Example 2 have been applied to PET containers at decoration speeds above 300 bottles per minute. No cracking of the labels was observed and adhesion of the label was excellent without the need for pre- or post-flaming.

Example 3

A heat transfer label was formed by printing the components of the transfer portion as described in the embodiment of FIG. 5. A solvent protective lacquer, Gotham PL2 Varnish 46-1333, was applied to a wax release paper using conventional flexographic printing techniques. The solvent lacquer was dried in a conventional enclosed hot air dryer.

A design was then printed over the protective lacquer layer using Gotham Ink Company FP-500 NUV series UV-curable inks using conventional flexographic printing techniques. 600 W GEW UV lamps were used after the application of each ink layer to cure the ink. Complete cure of the ink was observed with no tracking or smudging.

A UV tie-coat layer, Gotham FP-500 NUV75, a medium viscosity pale liquid having multi and mono functional acrylate oligomers and photo initiators was then overprinted on the design. 600 W GEW UV lamps were used to cure the tie-coat layer. Complete cure of the layer was observed with no tracking or smudging.

A UV-curable adhesive, Gotham FP-500 NUV85, was then overprinted on the design. 600 W GEW UV lamps were used to cure the adhesive layer. Complete cure of the layer was observed with no tracking or smudging. The resulting web was wound into roll form and utilized during the decorating step.

The decorating step utilized a conventional TD1000 heat transfer decorator, commercially available from Concept Machine and Design of Burlington, Ky. The resulting heat transfer laminate was brought into contact with a polyethylene bottle whose surface had been flame treated to render it receptive to adhesives. The desired heat transfer was accomplished using conventional application techniques. Testing for adhesion included containers that had not been post flamed.

Adhesion to the bottle was found to be excellent for both non-post flamed as well as post flamed containers as measured using a conventional tape test technique with both #810 and #610 tape.

The decorating window (that is, the available range of temperatures at which the label could be applied and meet performance criteria) was very wide. Preheat temperatures ranging from 150° F. to 225° F. and Platen temperatures ranging from 350° F. to 450° F. were sufficient to ensure excellent adhesion. No visual distortion to the label was observed even when preheat temperatures exceeded 225° F. The stretch point prior to cracking was tested and found to be 6%. During decoration at stretch rates of 2-3%, no vertical gathers were observed. Labels that were subjected to 5 minute dwell period on the preheater did not show visible signs of yellowing.

Example 4

Example 3 was repeated except that the UV cured adhesive layer was replaced with Actega HS30. Results were similar to Example 3 except that some yellowing of the adhesive layer was observed following application.

Example 5

A heat transfer label was formed by printing the components of the transfer portion as described in the embodiment of FIG. 6. A UV cured protective layer, Gotham FP-500 NUV98 (a protective lacquer), was applied to a wax release paper using conventional flexographic printing techniques. 600 W GEW UV lamps were used after the application of each ink layer to cure the ink.

A design was then printed over the protective lacquer layer using Gotham Ink Company FP-500 NUV series UV-curable inks using conventional flexographic printing techniques. 600 W GEW UV lamps were used after the application of each ink layer to cure the ink. Complete cure of the ink was observed with no tracking or smudging.

A UV tie-coat layer, Gotham FP-500 NUV75, a medium viscosity pale liquid having multi and mono functional acrylate oligomers and photo initiators was then overprinted on the design. 600 W GEW UV lamps were used to cure the tie-coat layer. Complete cure of the layer was observed with no tracking or smudging.

A UV-curable adhesive, Gotham FP-500 NUV85, was then overprinted on the design. 600 W GEW UV lamps were used to cure the tie-coat layer. Complete cure of the layer was observed with no tracking or smudging. The resulting web was wound into roll form and utilized during the decorating step.

The decorating step utilized a conventional TD1000 heat transfer decorator, commercially available from Turner Machine Company of Florence, Ky. The resulting heat transfer laminate was brought into contact with a polyethylene bottle whose surface had been flame treated to render it receptive to adhesives. The desired heat transfer was accomplished using conventional application techniques. Testing for adhesion included containers that had not been post flamed.

Adhesion to the bottle was found to be excellent for both non-post flamed as well as post flamed containers as measured using a conventional tape test technique with both #810 and #610 tape.

The decorating window (that is, the available range of temperatures at which the label could be applied and meet performance criteria) was very wide. Preheat temperatures ranging from 150° F. to 200° F. and Platen temperatures ranging from 350° F. to 400° F. were sufficient to ensure excellent adhesion. No visual distortion to the label was observed even when preheat temperatures exceeded 200° F. The stretch point prior to cracking was tested and found to be 6%. During decoration at stretch rates of 2-3%, no vertical gathers were observed. Labels that were subjected to 5 minute dwell period on the preheater did not show visible signs of yellowing.

The ink formulations that have been incorporated into the disclosed invention may be applied to the carrier web in various ways without affecting the functionality. Ink jet technologies are currently employing UV cured inks to print images and their use would be within the scope of the invention. Rotary letterpress and rotary screen techniques as well as the associated ink formulations would be within the scope of the invention.

Thus, heat transfer labels according to the various aspects of the present invention exhibit desirable performance characteristics in terms of print quality (and press performance) as well as decorating performance. Of particular advantage is the ability to apply all of the layers of the label construction using flexographic printing techniques rather than the more conventional (for heat transfer label) gravure printing techniques. Furthermore, the printing characteristics exhibited by the heat transfer labels of the present invention include: (1) an ink laydown and appearance that meets customer expectations for smooth laydown, sharpness of print, and color consistency; (2) the inks achieve density targets for process colors; (3) the ink viscosities match expectations for printing; (4) the inks cure at press speed; and (5) the inks do not block during storage in roll form or during slitting. The decoration characteristics exhibited by the heat transfer labels of the present invention include: (1) 100% tape adhesion with #610 tape (which is more aggressive than testing with #810 tape); (2) the ability to stretch label at least 3% during decoration to prevent vertical gathers; (3) the labels are heat stable during "rest" periods on a pre-heater for both open and panel graphics across a broad temperature range; and (4) label application to tapered containers, such as pails, occurs without cracking. For the various embodiments of the invention, adhesive chemistries were selected that required that the containers produced from HDPE be pre-flamed prior to the decoration step. Enhancements to both solvent based and UV-curable adhesives are anticipated that would negate the need for pre-flaming the container while still ensuring adhesion performance. Alternative adhesive chemistries may be employed to allow decoration of other container types Further, recent advances in printing press technology, in particular the use of combination printing, is expected to allow utilization of certain technologies such as cold foil, selective gravure printing, and screen printing.

The embodiments of the present invention recited herein are intended to be merely exemplary and those skilled in the art will be able to make numerous variations and modifications to it without departing from the spirit of the present invention. For example, the particular types of materials used in the adhesive, ink, and protective lacquer layers may be selected to optimize performance of the label, interlayer adhesion, article adhesion, and/or mechanical and chemical resistance suitable for the intended use of the article. Notwithstanding the above, certain variations and modifications, while producing less than optimal results, may still produce satisfactory results. All such variations and modifications are intended to be within the scope of the present invention as defined by the claims appended hereto.

What is claimed is:

1. A heat transfer label comprising:
(a) a support portion; and
(b) a transfer portion over said support portion for transfer of the transfer portion from the support portion to an article upon application of heat to the support portion while the transfer portion is placed into contact with the article, said transfer portion including at least:
a solvent-based protective lacquer layer consisting of an acrylic resin in an amount of 25 wt % to 35 wt %, isopropanol in an amount of 55 wt % to 65 wt %, and ethyl acetate in an amount of 5 wt % to 15 wt %;
an ink layer;
a solvent-based adhesive layer adapted to confront the article, wherein the adhesive layer consists of a polyamide resin in an amount of 30 wt % to 40 wt %, nitrocellulose in an amount of 0.1 wt % to 2 wt %, isopropanol in an amount of 50 wt % to 60 wt %, and ethyl acetate in an amount of 4 wt % to 8 wt %; and
a structural tie-coat layer disposed between said adhesive layer and said ink layer;
wherein said tie-coat layer comprises at least one polyfunctional acrylate so that the tie-coat layer can be UV cured.

2. The heat transfer label of claim 1, wherein the ink layer includes a UV-curable ink.

3. The heat transfer label of claim 2, wherein the UV-curable ink includes polyfunctional components.

4. The heat transfer label of claim 3, wherein the UV-curable ink includes polyfunctional acrylates in an amount greater than 30 wt % of the UV-curable ink.

5. The heat transfer label of claim 4, wherein the UV-curable ink includes polyfunctional acrylates in an amount of 65 wt % to 95 wt % of the UV-curable ink and a photoinitiator in an amount of 1 wt % to 20 wt % of the UV-curable ink.

6. The heat transfer label of claim 1, wherein the UV-curable tie-coat layer includes a UV-curable ink extender and a UV-curable heat activated adhesive.

7. The heat transfer label of claim 6, wherein the UV-curable ink extender is present in an amount of 50% to 99% by weight of the UV-curable tie-coat layer.

8. The heat transfer label of claim 6, wherein the UV-curable heat activated adhesive is present in an amount of 1-50% by weight of the UV-curable tie-coat layer.

9. A heat transfer label comprising:
(a) a support portion; and
(b) a transfer portion over said support portion for transfer of the transfer portion from the support portion to an article upon application of heat to the support portion while the transfer portion is placed into contact with the article, said transfer portion including at least:
a solvent-based protective lacquer layer consisting of an acrylic resin in an amount of 25 wt % to 35 wt %, isopropanol in an amount of 55 wt % to 65 wt %, and ethyl acetate in an amount of 5 wt % to 15 wt %;
an ink layer;
a solvent-based adhesive layer adapted to confront the article, wherein the adhesive layer consists of a polyamide resin in an amount of 30 wt % to 40 wt %, nitrocellulose in an amount of 0.1 wt % to 2 wt %, isopropanol in an amount of 50 wt % to 60 wt %, and ethyl acetate in an amount of 4 wt % to 8 wt %; and
a structural tie-coat layer disposed between said adhesive layer and said ink layer;
wherein each of the protective lacquer layer and adhesive layer are UV-curable, and each of the ink layer and tie-coat layer comprises at least one polyfunctional acrylate so that each of the ink layer and tie-coat layer can be UV-cured.

10. The heat transfer label of claim 9, wherein the UV-curable ink includes polyfunctional components.

11. The heat transfer label of claim 10, wherein the UV-curable ink includes polyfunctional acrylates in an amount greater than 30 wt % of the UV-curable ink.

12. The heat transfer label of claim 11, wherein the UV-curable ink includes polyfunctional acrylates in an amount of 65 wt % to 95 wt % of the UV-curable ink and a photoinitiator in an amount of 1 wt % to 20 wt % of the UV-curable ink.

13. The heat transfer label of claim 9, wherein the UV-curable tie-coat layer includes a UV-curable ink extender and a UV-curable heat activated adhesive.

14. The heat transfer label of claim 13, wherein the UV-curable ink extender is present in an amount of 50% to 99% by weight of the UV-curable tie-coat layer.

15. The heat transfer label of claim 13, wherein the UV-curable heat activated adhesive is present in an amount of 1-50% by weight of the UV-curable tie-coat layer.

16. A heat transfer label comprising:
(a) a support portion; and
(b) a transfer portion over said support portion for transfer of the transfer portion from the support portion to an article upon application of heat to the support portion while the transfer portion is placed into contact with the article, said transfer portion including at least:
a solvent-based protective lacquer layer consisting of an acrylic resin in an amount of 25 wt % to 35 wt %, isopropanol in an amount of 55 wt % to 65 wt %, and ethyl acetate in an amount of 5 wt % to 15 wt %;
an ink layer;
a solvent-based adhesive layer adapted to confront the article, wherein the adhesive layer consists of a polyamide resin in an amount of 30 wt % to 40 wt %, nitrocellulose in an amount of 0.1 wt % to 2 wt %, isopropanol in an amount of 50 wt % to 60 wt %, and ethyl acetate in an amount of 4 wt % to 8 wt %; and
a structural tie-coat layer disposed between said adhesive layer and said ink layer;
wherein said tie-coat layer is UV-curable, and wherein said tie-coat layer is adjacent and in confronting relationship with said adhesive layer, and adjacent and in confronting relationship with said ink layer.

17. A heat transfer label comprising:
(a) a support portion; and
(b) a transfer portion over said support portion for transfer of the transfer portion from the support portion to an article upon application of heat to the support portion while the transfer portion is placed into contact with the article, said transfer portion including at least:

a solvent-based protective lacquer layer consisting of an acrylic resin in an amount of 25 wt % to 35 wt %, isopropanol in an amount of 55 wt % to 65 wt %, and ethyl acetate in an amount of 5 wt % to 15 wt %;

an ink layer;

a solvent-based adhesive layer adapted to confront the article, wherein the adhesive layer consists of a polyamide resin in an amount of 30 wt % to 40 wt %, nitrocellulose in an amount of 0.1 wt % to 2 wt %, isopropanol in an amount of 50 wt % to 60 wt %, and ethyl acetate in an amount of 4 wt % to 8 wt %; and a UV-cured structural tie-coat layer disposed between said adhesive layer and said ink layer;

wherein said tie-coat layer is UV-cured from the exposure of at least an oligomer component, at least one polyfunctional acrylate, and a photoinitiator component to UV light.

* * * * *

UNITED STATES PATENT AND TRADEMARK OFFICE
CERTIFICATE OF CORRECTION

PATENT NO.        : 9,757,922 B2
APPLICATION NO.   : 12/699480
DATED             : September 12, 2017
INVENTOR(S)       : Ronald L. Miracle et al.

Page 1 of 1

It is certified that error appears in the above-identified patent and that said Letters Patent is hereby corrected as shown below:

Column 2,
Line 14, "is" should be -- are --.

Column 3,
Line 9, "are" should be -- is --.

Column 5,
Line 37, "is" should be -- are --.
Line 51, "are" should be -- is --.

Column 22,
Line 63, "types" should be -- types. --.
Line 65, "is" should be -- are --.

Column 24,
Line 16 (Claim 9), "are" should be -- is --.

Signed and Sealed this
Twenty-seventh Day of March, 2018

Andrei Iancu
*Director of the United States Patent and Trademark Office*